(12) United States Patent
Lee et al.

(10) Patent No.: US 11,454,809 B2
(45) Date of Patent: Sep. 27, 2022

(54) DISPLAY WAVEGUIDE ASSEMBLY WITH COLOR CROSS-COUPLING

(71) Applicant: Facebook Technologies, LLC, Menlo Park, CA (US)

(72) Inventors: Hee Yoon Lee, Bellevue, WA (US); Ningfeng Huang, Redmond, WA (US); Wai Sze Tiffany Lam, Redmond, WA (US); Pasi Saarikko, Kirkland, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 204 days.

(21) Appl. No.: 16/161,879

(22) Filed: Oct. 16, 2018

(65) Prior Publication Data

US 2020/0116997 A1 Apr. 16, 2020

(51) Int. Cl.
    *G02B 27/14* (2006.01)
    *G02B 27/00* (2006.01)
    *F21V 8/00* (2006.01)
    *G02B 27/10* (2006.01)
    *G02B 27/01* (2006.01)

(52) U.S. Cl.
    CPC ....... *G02B 27/0081* (2013.01); *G02B 6/0016* (2013.01); *G02B 6/0076* (2013.01); *G02B 27/1086* (2013.01); *G02B 27/0172* (2013.01); *G02B 2027/0123* (2013.01)

(58) Field of Classification Search
    CPC .. G02B 6/0038; G02B 6/0036; G02B 6/0076; G02B 6/0015; G02B 6/0035; G02B 6/0016; G02B 27/0081; G02B 27/1086; G02B 27/0172; G02B 2027/0123
    USPC .................. 359/13, 558, 566, 569, 618, 630
    See application file for complete search history.

(56) References Cited

U.S. PATENT DOCUMENTS

| | | | |
|---|---|---|---|
| 5,856,842 A | 1/1999 | Tedesco | 348/14.16 |
| 6,580,529 B1 | 6/2003 | Amitai et al. | |
| 6,757,105 B2 | 6/2004 | Niv et al. | 359/569 |
| 6,882,479 B2 | 4/2005 | Song et al. | 359/630 |
| 7,206,107 B2 | 4/2007 | Levola | |
| 7,710,655 B2 | 5/2010 | Freeman et al. | 359/636 |

(Continued)

FOREIGN PATENT DOCUMENTS

| | | |
|---|---|---|
| WO | 2016011367 A2 | 1/2016 |
| WO | 2016054092 | 4/2016 |
| WO | 2017102795 | 6/2017 |

OTHER PUBLICATIONS

PCT/US2019/055516 Search Report dated Dec. 20, 2019.
PCT/US2018/056501 Search Report dated Sep. 17, 2019.
International Preliminary Report on Patentability for International Application No. PCT/US2018/056496, dated Apr. 29, 2021, 10 Pages.

(Continued)

*Primary Examiner* — Mahidere S Sahle
(74) *Attorney, Agent, or Firm* — Pequignot + Myers; Matthew A. Pequignot

(57) ABSTRACT

A waveguide display includes a display projector for emitting polychromatic image light, and a waveguide assembly for transmitting image light to an exit pupil. The waveguide assembly includes two or more waveguides disposed in a stack, each having an in-coupler aligned with the other in-couplers and an offset out-coupler aligned with the other out-couplers. The assembly is configured so that at least one color channel of the image light propagates to the exit pupil along at least two waveguides. A method for selecting the waveguides of the stack to suppress color channel splitting at the exit pupil is provided.

20 Claims, 17 Drawing Sheets

(56) References Cited

U.S. PATENT DOCUMENTS

| | | | |
|---|---|---|---|
| 8,233,204 B1 | 7/2012 | Robbins et al. | |
| 8,314,993 B2 | 11/2012 | Levola | |
| 8,548,290 B2 | 10/2013 | Travers et al. | 385/37 |
| 8,837,050 B2 | 9/2014 | Hudman | 359/619 |
| 9,933,684 B2 | 4/2018 | Brown et al. | |
| 2006/0221448 A1 | 10/2006 | Nivon et al. | |
| 2013/0314789 A1 | 11/2013 | Saarikko et al. | |
| 2016/0116739 A1* | 4/2016 | TeKolste | G02B 6/005 385/36 |
| 2017/0299860 A1 | 10/2017 | Wall et al. | |
| 2017/0357089 A1 | 12/2017 | Tervo et al. | |
| 2018/0275350 A1* | 9/2018 | Oh | G02B 27/0189 |
| 2018/0292654 A1 | 10/2018 | Wall et al. | |

OTHER PUBLICATIONS

International Preliminary Report on Patentability for International Application No. PCT/US2018/056501, dated Apr. 29, 2021, 08 Pages.

International Preliminary Report on Patentability for International Application No. PCT/US2019/055516, dated Apr. 29, 2021, 8 Pages.

International Search Report and Written Opinion for International Application No. PCT/US2018/056496, dated Sep. 17, 2019, 15 Pages.

European Search Report for European Patent Application No. 22157350.4, dated May 11, 2022, 7 pages.

* cited by examiner

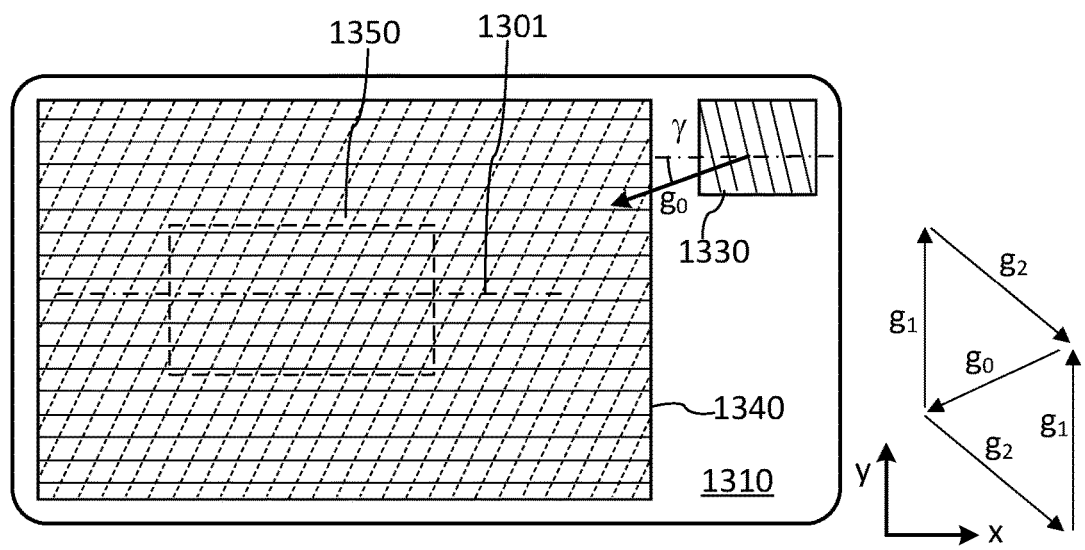
FIG. 18A
FIG. 18B
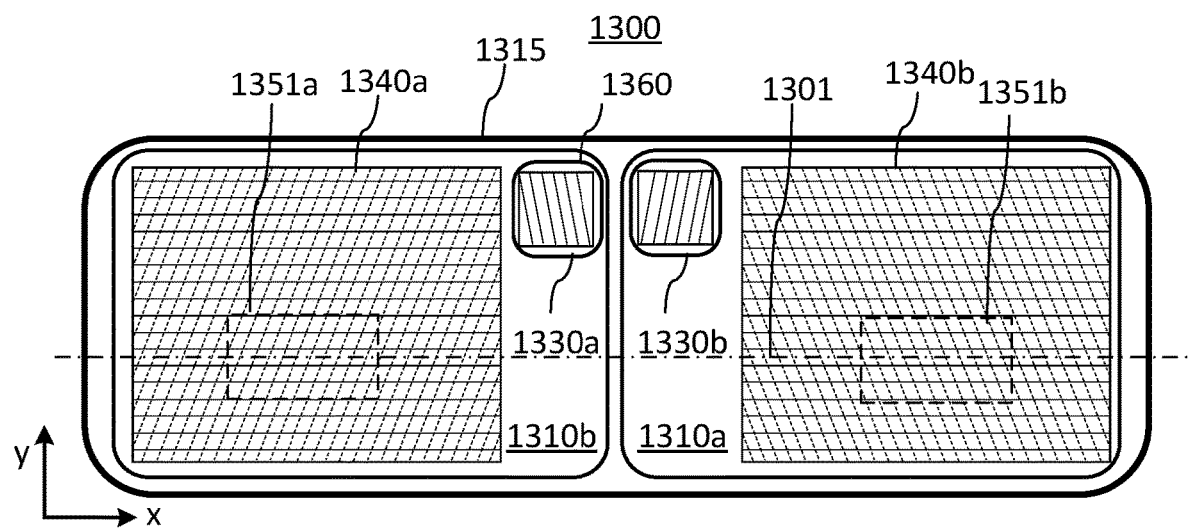
FIG. 18C

DISPLAY WAVEGUIDE ASSEMBLY WITH COLOR CROSS-COUPLING

TECHNICAL FIELD

The present disclosure generally relates to optical display systems and devices, and in particular to waveguide displays and components therefor.

BACKGROUND

In certain types of display systems, such as wearable displays for augmented reality (AR) applications, heads-up displays, heads-down displays, and the like, an electronic display may be positioned away from the direct line of sight of the user. One approach that can be used in such systems to bring images from a display projector to the user of the system is by means of an optical waveguide. Optical waveguides also enable expanding an image beam from a microdisplay within a small device volume, which is advantageous for wearable displays that have to be compact and lightweight. However, optical waveguides typically provide a limited field of view, in particular when the image light is polychromatic.

BRIEF DESCRIPTION OF THE DRAWINGS

Embodiments disclosed herein will be described in greater detail with reference to the accompanying drawings which represent example embodiments thereof, in which like elements are indicated with like reference numerals, and wherein:

FIG. 18A is a schematic diagram illustrating an example layout for a 2D waveguide assembly with an in-coupler diagonally offset from an exit pupil of an out-coupler;

FIG. 18B is a schematic diagram illustrating a vector diagram of grating vectors in the example layout of FIG. 17A;

FIG. 18C is a schematic plan view of a NED using two waveguide assemblies with diagonally offset in-couplers side by side;

DETAILED DESCRIPTION

Figure 1A:
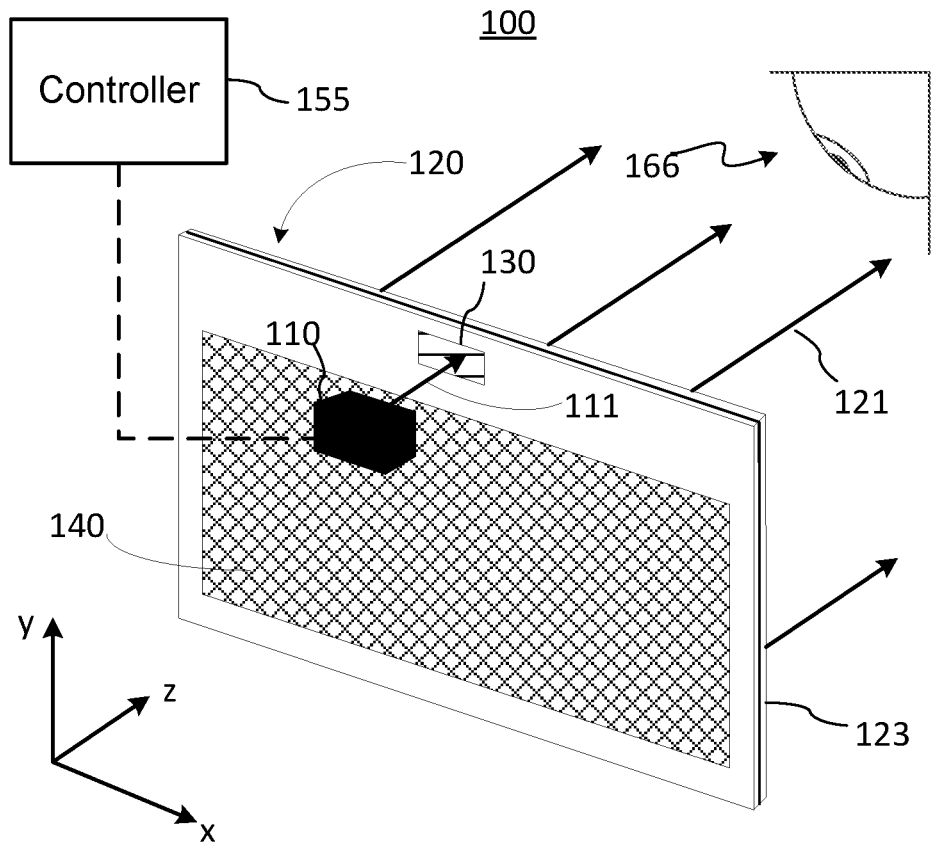
FIG. 1A is a schematic isometric view of a waveguide display system using a waveguide assembly with color cross-coupling for transmitting images to a user.

In the following description, for purposes of explanation and not limitation, specific details are set forth, such as particular optical and electronic circuits, optical and electronic components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the example embodiments. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Note that as used herein, the terms "first", "second", and so forth are not intended to imply sequential ordering, but rather are intended to distinguish one element from another, unless explicitly stated. Similarly, sequential ordering of method or process steps does not imply a sequential order of their execution, unless explicitly stated.

Furthermore, the following abbreviations and acronyms may be used in the present document: HIVID (Head Mounted Display); NED (Near Eye Display); VR (Virtual Reality); AR (Augmented Reality); MR (Mixed Reality); LED (Light Emitting Diode); FOV (Field of View); TIR (Total Internal Reflection).

Example embodiments may be described hereinbelow with reference to polychromatic light that is comprised of three distinct color channels, generally referred to as the first color channel having a first center wavelength $\lambda_1$, the second color channel having a second center wavelength $\lambda_2$, and the third color channel having a third center wavelength $\lambda_3$. For certainty it will be assumed that the second color channel is positioned spectrally between the first and second color channels, although this is a matter of convention and is not meant to be limiting. In at least some embodiments it may be assumed that $\lambda_1 < \lambda_2 < \lambda_3$ for further certainty, which is also not limiting. The first color channel may be referred to as the blue (B) channel or color and may represent the blue channel of an RGB (Red, Green, Blue) color scheme, the second color channel may be referred to as the green (G) channel or color and may represent the green channel of the RGB color scheme, and the third color channel may be referred to as the red (R) channel or color and may represent the red channel of the RGB color scheme. It will be appreciated however that the embodiments described herein may be adapted for use with polychromatic light comprised of any combination of two or more, or preferably three or more color channels, which may represent non-overlapping portions of a relevant optical spectrum.

An aspect of the present disclosure relates to a display system comprising a waveguide stack and an image light source coupled thereto, wherein the waveguide stack is configured to receive polychromatic image light emitted by the image light source and to convey the image light received in the polychromatic FOV of the waveguide stack to an eyebox for presenting to a user, wherein at least one of color channels of the polychromatic image light may be conveyed to the eyebox over two or more waveguides of the waveguide stack.

An aspect of the present disclosure relates to a waveguide stack for conveying image light comprising a plurality of color channels from an image light source to an exit pupil or an eyebox of a waveguide display. The waveguide stack may comprise a plurality of waveguides stacked one over another, each waveguide comprising an input coupler and an output coupler. The input coupler and the output coupler of each waveguide define a field of view (FOV) of the waveguide at each of the plurality of color channels, the FOVs of the plurality of waveguides in combination defining a polychromatic FOV of the waveguide stack. The plurality of color channels of the image light may comprise a first, second, and third color channels, with the second color channels located spectrally between the first and third color channels. The waveguide stack may be configured for transmitting at least one of the color channels of the image light to the eyebox within different waveguides of the waveguide stack. Each input coupler may comprise an input diffraction grating configured to couple a portion of the image light into a corresponding waveguide thereby obtaining in-coupled light propagating in the waveguide toward the output coupler thereof. Each output coupler may comprise one or more output diffraction gratings configured to extract the in-coupled light out of the waveguide toward the eyebox. In some implementations the output coupler of at least one waveguide may comprise two diffraction gratings, which may be configured to expand the in-coupled light in two dimensions and to extract expanded light out of the waveguide.

In some implementations the plurality of waveguides of the waveguide stack may comprise a first waveguide and a second waveguide, each of which configured to transmit the second color channel of the image light to the eyebox. In some implementations the input couplers of the first and second waveguides are configured so that a beam of the image light of the second color channel received from a first portion of the polychromatic FOV of the waveguide stack is transmitted to the eyebox over the first waveguide, and a beam of the image light of the second color channel received from a second portion of the polychromatic FOV of the waveguide stack is transmitted to the eyebox over the second waveguide.

In some implementations the first and second waveguides may be configured so that the FOV of the first waveguide at the first color channel and the FOV of the second waveguide at the third color channel share a common FOV portion comprising the polychromatic FOV of the waveguide stack. In some implementations the first and second waveguides may be configured so that the FOV of the first waveguide at the first color channel is aligned with the FOV of the second waveguide at the third color channel. In some implementations the input coupler of the first waveguide may comprise a diffraction grating having a first pitch $p_1$, the input coupler of the second waveguide may comprises a diffraction grating having a second pitch $p_2 > p_1$. In some implementations $\lambda_1/p_1$ may be generally equal to $\lambda_3/p_2$, where $\lambda_1$ and $\lambda_3$ are central wavelengths of the first color channels, respectively.

In some implementations the plurality of waveguides of the waveguide stack may further comprise a third waveguide, wherein the input coupler of the third waveguide comprises a diffraction grating having a third pitch $p_3 > p_2$. In some implementations each of the first, second, and third waveguides is configured to transmit at least two color channels of the image light to the eyebox for broadening the polychromatic FOV of the waveguide stack. The FOVs of the first and second waveguides may partially overlap at each color channel to define a first shared FOV, the FOVs of the second and third waveguides may partially overlap at each color channel to define a second shared FOV. In some implementations the input couplers of the first, second, and third waveguides may be configured so that the polychromatic FOV of the waveguide stack exceeds, in at least one dimension, the FOV of each one of the first, second, and third waveguides at each of the first, second, and third color channels. In some implementations each of the first and second shared FOVs does not exceed 20 degrees in at least one of the first, second, and third color channels in at least one dimension.

In some implementations the one or more output diffraction gratings of the output coupler of at least one waveguide may be configured to define an eyebox projection area of the waveguide from which the image light is projected onto the eyebox, the eyebox projection area having a horizontal axis defined relative to the eyebox. In some implementations the one or more output diffraction gratings of the output coupler of at least one waveguide may comprise at least one of: a two-dimensional diffraction grating, or two linear diffraction gratings disposed at an angle to one another and to the input diffraction grating. In some implementations the input diffraction grating may have a grating vector oriented at an angle to the horizontal axis of the eyebox projection area that is less than 40 degrees.

An aspect of the present disclosure relates to a near-eye display system comprising: at least one light projector configured to emit image light comprising a plurality of color channels; and, two waveguide assemblies, each configured to convey image light from the at least one light projector to a different eye of a user, wherein each of the two waveguide assemblies comprises an in-coupler for receiving the image light from the at least one light projector and an out-coupler for conveying the image light from the waveguide assembly to an eye of the user, and wherein the in-couplers are disposed at least partially between the out-couplers, or the out-couplers are disposed at least partially between the in-couplers. In some implementations of the near-eye display system each out-coupler of the two waveguide assemblies comprises an eyebox projection area from which the image light is projected to an eye of the user, wherein the eyebox projection areas are disposed on a horizontal axis, and wherein the in-couplers of the two waveguide assemblies are offset from the horizontal axis.

An aspect of the present disclosure provides a method for fabricating a waveguide stack with color cross-coupling wherein a same color channel of the polychromatic image light may be conveyed to the exit pupil over two different waveguides of the waveguide stack. The method may comprise: a) determining an exit angle of a first reference light beam for each waveguide from a plurality of first waveguides and a plurality of second waveguides, and b) selecting, for the waveguide stack, a first waveguide from the plurality of first waveguides and a second waveguide from the plurality of second waveguide based on the exit angles of the first reference beam. The selecting in b) may comprise selecting the first waveguide and second waveguide for which the exit angles match with a pre-defined accuracy.

Step a) of the method in some embodiments thereof may comprise directing the first reference light beam to impinge upon the in-coupler of each waveguide at a first angle of incidence, and measuring the exit angle at which the first reference light beam exits the out-coupler of the corresponding waveguide.

In at least some implementations, each waveguide from the plurality of first waveguides may be configured for conveying at least a first color channel of the polychromatic image light to the exit pupil, each waveguide from the plurality of second waveguides may be configured for conveying at least one of a second color channel or a third color channel of the polychromatic image light to the exit pupil, wherein the second color channel may be located spectrally between the first and third color channels.

Each first waveguide may have a first FOV defining a range of incidence angles of the polychromatic image light upon the first waveguide that can be conveyed to the exit pupil, and each second waveguide may have a second FOV defining a range of incidence angles of the polychromatic image light upon the second waveguide that can be conveyed to the exit pupil. In some implementations the first reference light beam may comprise a first reference wavelength, and the first FOV and second FOV may partially overlap at the first reference wavelength to define a first shared FOV. The first angle of incidence may be selected within the first shared FOV. In some implementations the first reference wavelength may be a wavelength of the second color channel.

In some implementations the method may comprise combining the selected first and second waveguides to form the waveguide stack so as to allow the second color channel to be partially coupled into both the first and second waveguides by the in-couplers thereof.

In some implementations the method may comprise binning the first and second waveguides based on the exit angles measured therefor. The binning may comprise: assigning at least some of the first waveguides to one of a plurality of first bins based on the exit angle measured therefor, so that the exit angles measured for the first waveguides assigned to a same first bin differ by no more than a first threshold value; and, assigning at least some of the second waveguides to one of a plurality of second bins based on the exit angle measured therefor, so that the exit angles measured for the second waveguides assigned to a same second bin differ by no more than a second threshold value. The method may further comprise selecting the first and second waveguides from matching first and second bins, respectively.

In some implementations the waveguide stack may comprise a third waveguide configured for conveying at least the third color channel of the polychromatic image light to the exit pupil, and the method may further comprise: determining an exit angle of the first reference light beam for each waveguide of a plurality of third waveguides; and selecting, from the plurality of third waveguides, a selected third waveguide for combining with the selected first and second waveguides in the waveguide stack based on the exit angles determined for the first, second, and third waveguides. In some implementations the method may include selecting one of the third waveguides for which the exit angle of the first reference light beam matches the exit angles thereof measured for the selected first and second waveguides with a pre-defined accuracy. In some implementations the method may include binning the first, second, and third waveguides into three sets of bins based on the exit angles measured therefor. The binning may comprise: assigning each one of the first waveguides to one of a plurality of first bins based on the exit angles measured therefor; assigning each one of the second waveguides to one of a plurality of second bins based on the exit angles measured therefor; and, assigning each one of the third waveguides to one of a plurality of third bins based on the exit angles measured therefor. The first, second, and third waveguides may then be selected for the waveguide stack from matching first, second, and third bins, respectively.

In some implementations the waveguide stack may comprise a third waveguide configured for conveying at least the third color channel of the polychromatic image light to the exit pupil, and the method may comprise determining an exit angle of a second reference light beam from each waveguide of the plurality of second waveguides and a plurality of third waveguides, and selecting one of the third waveguides for the waveguide stack based on the exit angles of the second reference light beam determined for the second and third waveguides. The exit angle of the second reference light beam may be determined by directing the second reference light beam upon the in-coupler of each waveguide from the pluralities of second and third waveguides, and measuring the exit angle at which the second reference light beam exits the out-coupler of the waveguide.

In some implementations the second reference light beam may be directed upon the in-coupler at a second angle of incidence that is different from the first angle of incidence. In some implementations the second reference light beam may comprise a wavelength of one of the first or third color channels.

In some implementations each third waveguide has a third FOV that partially overlaps with the second FOV at a second wavelength to define a second shared FOV, and wherein the first reference light beam comprises the first wavelength and is directed upon the in-coupler at the first angle of incidence selected within the first shared FOV, and the second reference light beam comprises the second wavelength and is directed upon the in-coupler at an angle of incidence selected within the second shared FOV.

In some implementations the method may comprise: assigning each one of the first waveguides to one of a plurality of first bins based on the exit angles of the first reference light beam measured therefor; assigning each one of the second waveguides to one of a plurality of second bins based on the exit angles of the first reference light beam measured therefor; assigning each one of the third waveguides to one of a plurality of third bins based on the exit angles of the second reference light beam measured therefor; and, for each second bin, determining a range of the exit angles of the second reference beam measured for the second waveguides assigned thereto; selecting matching first and second bins from the pluralities of first and second bins, respectively, based on the exit angle of the first reference light beam; and selecting, from the plurality of third bins, a third bin that matches the selected second bin with respect to the exit angle of the second reference light beam.

Example embodiments of the present disclosure will now be described with reference to a waveguide display. Generally a waveguide display may include an image light source such as an electronic display assembly, a controller, and an optical waveguide configured to transmit image light from the electronic display assembly to an exit pupil for presenting images to a user. The image light source may also be referred to herein as a display projector or the light projector. Example display systems that may incorporate a waveguide display, and wherein features and approaches disclosed here may be used, include, but not limited to, a near-eye display (NED), a head-up display (HUD), a head-down display, and the like.

Figure 1B:
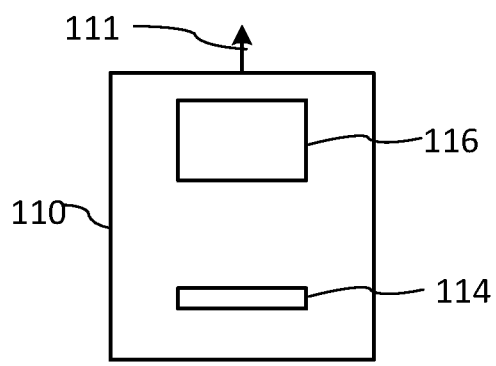
FIG. 1B is a schematic block diagram of a display projector of the waveguide display of FIG. 1A.

With reference to FIGS. 1A and 1B, there is illustrated a waveguide display 100 in accordance with an embodiment. The waveguide display 100 includes an electronic display assembly 110, a waveguide assembly 120, and may further include a display controller 155. The electronic display assembly 110 is configured to generate image light 111, and may include a pixelated electronic display 114 that may be optically followed by an optics block 116. The electronic display assembly 110 may also be referred to therein as the display projector or the light projector.

The electronic display 114 may be any suitable electronic display configured to display images, such as for example but not limited to a liquid crystal display (LCD), an organic light emitting display (OLED), an inorganic light emitting display (ILED), an active-matrix organic light-emitting diode (AMOLED) display, or a transparent organic light emitting diode (TOLED) display. In some embodiment the electronic display 114 may be in the form of a linear array of light sources, such as light-emitting diodes (LED), laser diodes (LDs), or the like, with each light source configured to emit polychromatic light. In other embodiments it may include a two-dimensional (2D) pixel array, with each pixel configured to emit polychromatic light.

The optics block 116 may include one or more optical components configured to suitably condition the image light emitted by the electronic display 114. This may include, without limitation, expanding, collimating, correcting for aberrations, and/or adjusting the direction of propagation of the image light emitted by the electronic display 114, or any other suitable conditioning as may be desired for a particular system and electronic display. The one or more optical components in the optics block 116 may include, without limitations, one or more lenses, mirrors, apertures, gratings, or a combination thereof. In some embodiments the optics block 116 may include one or more adjustable elements operable to scan the beam of light emitted by the electronic display 114 with respect to it propagation angle.

The waveguide assembly 120 may be in the form of, or include, a waveguide stack 123 composed of two or more waveguides stacked one after another in series. The waveguide assembly 120 further includes an input coupler 130 that may be disposed at a location where it can receive the image light 111 from the display assembly 110. The input coupler 130, which may also be referred to herein as the in-coupler 130, is configured to couple the image light 111 into the waveguide stack 123, where it propagates toward an output coupler 140. The output coupler 140, which may also be referred to herein as the out-coupler, may be offset from the input coupler 130 and is configured to de-couple the image light from the waveguide assembly 120 and direct it in a desired direction, such as for example toward a user's eye 166. The out-coupler 140 may be greater in size than the in-coupler 130 to expand the image beam in size as it leaves the waveguide to support a larger exit pupil than that of the display assembly 110. In some embodiments the waveguide assembly 120 may be partially transparent to outside light, and may be used in AR applications. The waveguide assembly 120 or embodiments and variants thereof described below, and individual waveguides it comprises, may be referred to as one-dimensional (1D) when the angle of incidence of input image light 111 upon the in-coupler 130 varies in a single dimension, for example in the (z,y) plane in FIG. 1A, and as two-dimensional (2D) when the angle of incidence of input image light 111 varies in two dimensions, for example along the x-axis and the y-axis. Here and in the following description a Cartesian coordinate system (x,y,z) is used for convenience, in which the (x,y) plane is parallel to the main faces of the waveguide assembly 120 through which the assembly receives and/or outputs the image light, and the z-axis is orthogonal thereto.

Figure 2A:
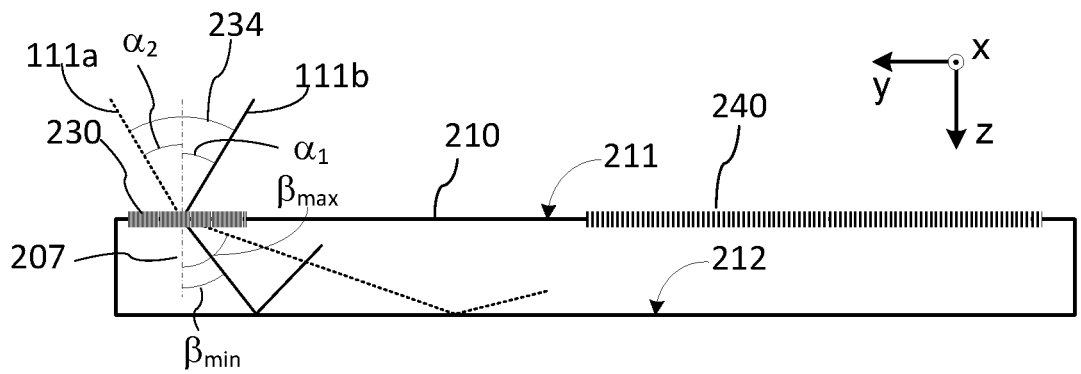
FIG. 2A is a schematic diagram illustrating the coupling of a first color channel into a waveguide and an input FOV for the first color channel.
Figure 2B:
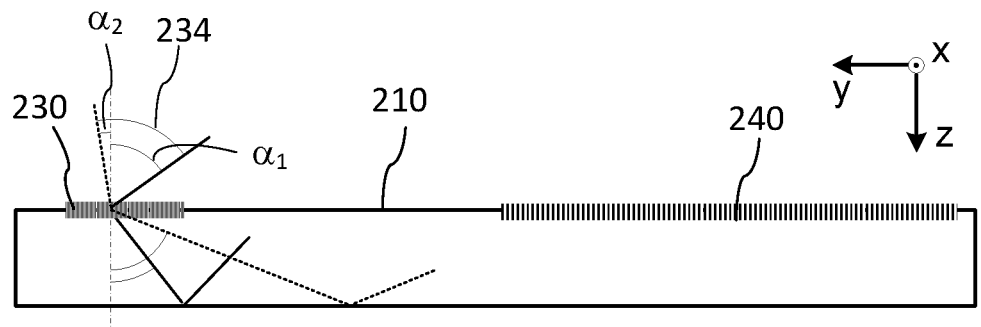
FIG. 2B is a schematic diagram illustrating the coupling of a second color channel into the display waveguide of FIG. 2A and an input FOV of the second color channel.

Referring now to FIGS. 2A and 2B, they schematically illustrate the coupling of light of two different wavelengths into a waveguide 210, which represents one of the waveguides of the waveguide stack 123. The wavelength λ of incident light in FIG. 2A may be different, for example smaller, than the wavelength of incident light in FIG. 2B. FIG. 2A may represent, for example, the operation of waveguide 210 for green light, while FIG. 2B may for example represent the operation of waveguide 210 for red light. Waveguide 210 may be a slab waveguide, for example in the form of a thin plate of an optical material that is transparent in visible light, such as glass or suitable plastic or polymer as non-limiting examples, and has a refractive index n that is greater than that of surrounding media, and may be for example in the range of 1.4 and 2.0. Waveguide 210 has two opposing main faces 211, 212 that may be nominally parallel to each other, through which image light may enter or leave the waveguide. An in-coupler 230 may be provided in or upon the waveguide 210 and may be in the form of one or more diffraction gratings. An out-coupler 240, which may also be in the form of one or more diffraction gratings, is laterally offset from the in-coupler 230, in the illustrated example along the y-axis. In the illustrated embodiment the out-coupler 240 is located at the same face 211 of the waveguide 210 as the in-coupler 130, but in other embodiments it may be located at the opposite face 212 of the waveguide. Some embodiments may have two input gratings that may be disposed at opposing faces 211, 212 of the waveguide, and/or two output gratings that may be disposed at opposing faces 211, 212 of the waveguide. The gratings embodying couplers 230, 240 may be any suitable diffraction gratings, including volume and surface-relief gratings, such as for example blaze gratings. The gratings may also be volume holographic gratings. In some embodiments they may be formed in the material of the waveguide itself. In some embodiments they may be fabricated in a different material or materials that may be affixed to a face or faces of the waveguide at desired locations. In the example embodiment illustrated in FIGS. 2A and 2B, the in-coupler 230 is embodied as a diffraction grating operating in transmission, while the out-coupler 240 is embodied as a diffraction grating operating in reflection.

The in-coupler 230 may be configured to provide the waveguide 210 with an input field of view (FOV) 234, which may also be referred to herein as the acceptance angle. The input FOV 234, which depends on the wavelength, defines a range of angles of incidence a for which the light incident upon the in-coupler 230 is coupled into the waveguide and propagates toward the out-coupler 240. In the context of this specification, "coupled into the waveguide" means coupled into the guided modes of the waveguide or modes that have suitably low radiation loss, so that light coupled into the waveguide becomes trapped therein by total internal reflection (TIR), and propagates within the waveguide with suitably low attenuation until it encounters an out-coupler. Thus waveguide 210 may trap light of a particular wavelength λ by means of TIR, and guide the trapped light toward the out-coupler 240, provided that the angle of incidence of the light upon the in-coupler 230 from the outside of the waveguide is within the input FOV 234 of the waveguide 210. The input FOV 234 of the waveguide is determined at least in part by a pitch p of the in-coupler grating 230 and by the refractive index n of the waveguide. For a given grating pitch p, the first-order diffraction angle β of the light incident upon the grating 230 from the air at an angle of incidence α in the (y,z) plane may be found from a diffraction equation (1):

$$n \cdot \sin(\beta) + \sin(\alpha) = \lambda/p \tag{1}$$

Here the angle of incidence a and the diffraction angle β are positive if corresponding rays are on the same side from the normal 207 to the opposing faces 211, 212 of the waveguide and is negative otherwise. Equation (1) may be easily modified for embodiments in which the waveguide 210 is surrounded by cladding material with refractive index $n_c>1$. Equation (1) holds for rays of image light with a plane of incidence normal to the groves of the in-coupler grating, i.e. when the grating vector of the in-coupler grating lies within the plane of incidence of image light.

The TIR condition for the diffracted light within the waveguide, referred hereinafter as the in-coupled light, is defined by the TIR equation (2):

$$n \cdot \sin(\beta) \geq 1, \tag{2}$$

where the equality corresponds to a critical TIR angle $\beta_c$=a sin (1/n). The input FOV 234 of the waveguide spans between a first FOV angle of incidence $\alpha_1$ and a second FOV angle of incidence $\alpha_2$, which may be referred to herein as the FOV edge angles. The first FOV angle of incidence $\alpha_1$ corresponding to the right-most incident ray 111b in FIG. 2A is defined by the critical TIR angle $\beta_c$ of the in-coupled light, i.e. light trapped within the waveguide:

$$\alpha_1 = \mathrm{asin}\left(\frac{\lambda}{p} - 1\right), \tag{3}$$

The second FOV angle of incidence $\alpha_2$, corresponding to the left-most incident ray 111a in FIG. 2A, is defined by a limitation on a maximum angle $\beta_{max}$ of the in-coupled light:

$$\alpha_2 = \mathrm{asin}\left(\frac{\lambda}{p} - n \cdot \sin(\beta_{max})\right), \tag{4}$$

The width $|FOV|=|\alpha_1-\alpha_2|$ of the input FOV 234 of the waveguide 210 at a particular wavelength can be estimated from equations (3) and (4). By way of example, for $\beta_{max}$=75°, and λ/p=1.3, |FOV|≅26° for n=1.5, and |FOV|≅43° for n=1.8. Generally the FOV of a waveguide increases as the refractive index of the waveguide increases, or as the refractive index contrast with the surrounding media rises.

As can be seen from equations (3) and (4), the input FOV 234 of waveguide 210 is a function of the wavelength λ of input light, so that the input FOV 234 shifts its position in the angle space as the wavelength changes; for example, it shifts towards the output coupler 240 as the wavelength increases. Thus it can be challenging to provide a sufficiently wide FOV for polychromatic image light.

Figure 3A:
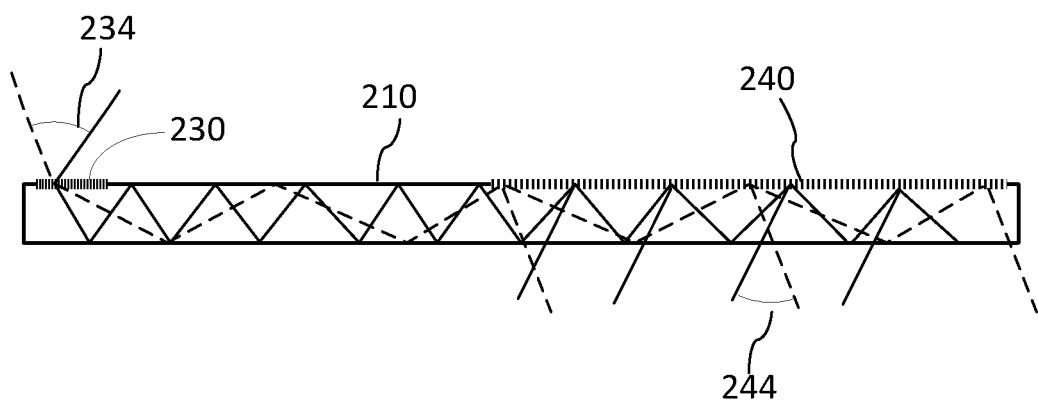
FIG. 3A is a schematic diagram illustrating input and output FOVs of a display waveguide for a selected color channel.

Referring to FIG. 3A, light coupled into the waveguide 210 by the in-coupler 230 propagates in the waveguide toward the out-coupler 240. The out-coupler 240 is configured to re-direct at least a portion of the in-coupled light out of the waveguide 210 at an angle or angles within an output FOV 244 of the waveguide, which is defined at least in part by the output coupler 240. An overall FOV of the waveguide, i.e. the range of incidence angles α that may be conveyed to the viewer by the waveguide, may be affected by both the in-coupler 230 and the out-coupler 240.

In some embodiments the gratings embodying the in-coupler 230 and the out-coupler 240 may be configured so that the vector sum of their grating vectors $k_g$ is equal to substantially zero, or to some net vector of a suitably small magnitude, within an error threshold that may be allowed for a particular display system:

$$|\Sigma k_g| \approx 0. \tag{5}$$

Here the summation in the left hand side (LHS) of equation (5) is performed over grating vectors $k_g$ of all gratings that diffract the input light traversing the waveguide, including the one or more gratings of the in-coupler 230, and the one or more gratings of the out-coupler 230. A grating vector $k_g$ is a vector that is directed normally to the equal-phase planes of the grating, i.e. its "grooves", and which magnitude is inversely proportional to the grating pitch p, $|k_g|=2\pi/p$. Under conditions of equation (5), rays of the image light exit the waveguide by means of the out-coupler 240 at the same angle at which they entered the in-coupler 230, provided that the waveguide 210 is an ideal slab waveguide with parallel opposing faces 211, 212. In an example embodiment with a single one-dimensional (1D) input grating and a 1D output grating, the grating pitch of the out-coupler 240 may be substantially equal to the grating pitch of the in-coupler 230. In embodiments where both the in-coupler and the out-coupler are in the form of a linear (1D) diffraction grating of a same pitch, and each in-coupled ray reaches the out-coupler grating that diffracts it out of the waveguide, the FOV of the waveguide is defined by the input FOV 234 thereof.

Figure 3B:
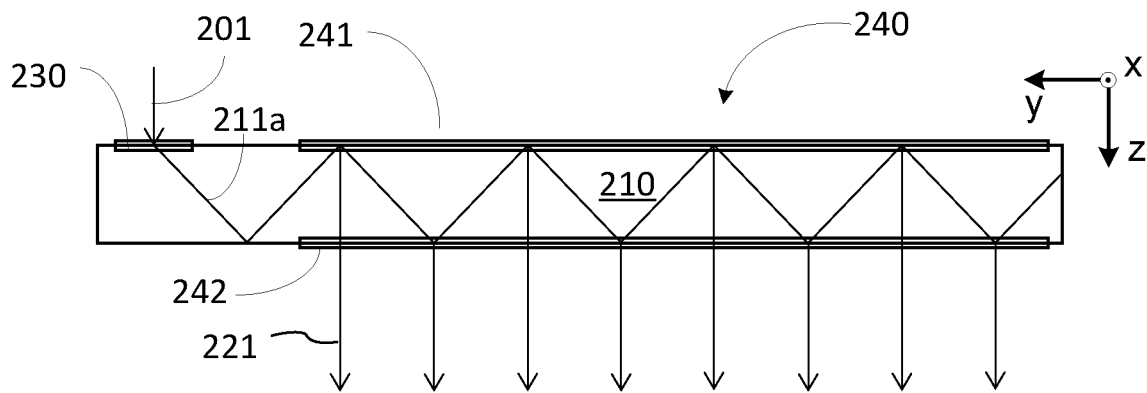
FIG. 3B is a schematic diagram illustrating the transmission of light by a display waveguide with two output gratings at opposing faces of the waveguide.

FIG. 3B illustrates an embodiment in which the out-coupler 240 includes two diffraction gratings 241, 242 that are disposed at opposing faces of the waveguide. In such embodiments the in-coupled light 211a may exit the waveguide as output light 221 after being sequentially diffracted by the diffraction gratings 241 and 242. In some embodiments, the grating vectors $g_1$ and $g_2$ of the diffraction gratings 241, 242 may be directed at an angle to each other. In at least some embodiments they may be selected so that $(g_0+g_1+g_2)=0$, where $g_0$ is the grating vector of the in-coupler 230. In some embodiments, the two gratings 241, 242 may be superimposed to form a single 2D grating, which may be formed at either of the two opposing faces of the waveguide or within the waveguide's volume.

In the following description certain features of the present disclosure will be first illustrated by considering waveguide FOVs in one dimension, with the wavevector of the input light $k_{in}$ lying in (z,y) plan, and for embodiments in which both the in-coupler and the out-coupler are linear gratings with the same pitch p and the grating vectors directed along the y-axis. In such embodiments, each beam of light that strikes the in-coupler at an angle of incidence a that satisfies the TIR conditions described above with reference to equations (3) and (4), will exit the out-coupler at the same angle α, and therefore the FOV of each waveguide is fully described by its input FOV in one dimension, i.e. with respect to a single angle of incidence. Extensions to a 2D operation, where both the input light 201 and the output light 221 may fan out in two dimensions, and thus the waveguide's operation may be characterized by a two-dimensional (2D) FOV, will then be described with reference to example embodiments and FIGS. 12-15.

Figure 4:
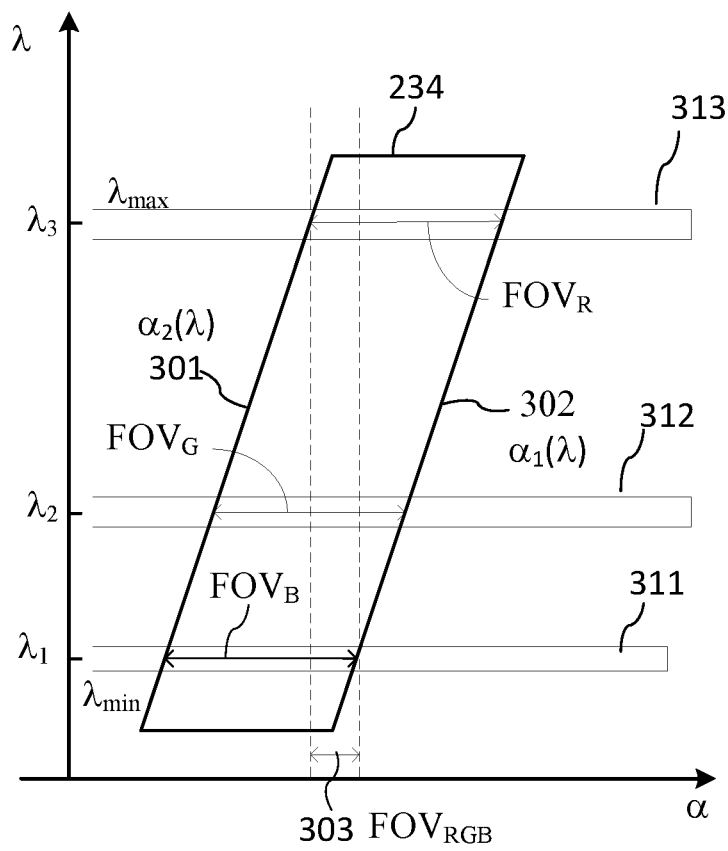
FIG. 4 is a graph schematically illustrating the input FOV of a display waveguide as an area in a plane with coordinates "wavelength" ($\lambda$) and "angle of incidence" ($\alpha$)

Referring to FIG. 4, the wavelength dependence of a FOV 234 of a waveguide of the type illustrated in FIGS. 2A-3B is schematically illustrated as an area in a plane (α, λ), where the wavelength λ varies along the vertical axis, and the angle of incidence in the (y, z) plane a varies along the horizontal axis. Lines 301 and 302 represent the two FOV edge angles $\alpha_2(\lambda)$ and $\alpha_1(\lambda)$ that define the FOV boundaries as functions of the wavelength λ. The position of FOV 234 along the α axis depends on the grating pitch of the in-coupler, while its width |FOV(λ)| at a fixed wavelength is correlated positively with the refractive index n of the waveguide. A polychromatic display system may operate with three or more color channels, which are represented in the figure as a first color channel 311 with a first center wavelength $\lambda_1$, a second color channel 312 with a second center wavelength $\lambda_2$, and a third color channel 313 with a third center wavelength $\lambda_3$, where $80_1<\lambda_2<\lambda_3$. In example embodiments described hereinbelow the display projector may be using the RGB color scheme, in which case the first color channel 311 may be blue (B), the second color channel 312 may be green (G), and the third color channel 313 may be red (R). Other embodiments may use another set of color channels, typically three or more. The net input FOV 303 of the waveguide for polychromatic light containing all three color channels 311-313 may be referred to as the polychromatic FOV or RGB FOV and denoted as $FOV_{RGB}$. It is defined by a common portion of the input FOV 234 of the waveguide 210 at all three color channels, which are indicates in the figure as $FOV_B$, $FOV_G$, and $FOV_R$:

$$FOV_{RGB} = FOV_R \cap FOV_G \cap FOV_B.$$

$FOV_{RGB}$ 303 extends from $\alpha_2(\lambda_{max})$ to $\alpha_1(\lambda_{min})$, where $\lambda_{min}$ is the smallest wavelength of the input light and $\lambda_{max}$ is the greatest wavelength of the input light. For RGB light $\lambda_{min}$ may define a short-wavelength edge of the blue color channel, and $\lambda_{max}$ may define a long-wavelength edge of the red color channel. As can be clearly seen from FIG. 4, the net polychromatic FOV of waveguide 210, $FOV_{RGB}$ 303, is considerably narrower than the FOV 234 at each color channel individually, and may vanish for small n when $\alpha_2(\lambda_{max}) \leq \alpha_1(\lambda_{min})$ Turning now to FIG. 5, there is illustrated an example waveguide assembly 400 that is comprised of a stack of several waveguides disposed one over the other, each of which may be an embodiment of the waveguide 210 of FIGS. 2A-3B. The waveguide assembly 400 may be configured to collect, from a target FOV 403, polychromatic light 401 comprised of three color channels, and to deliver the collected light to an exit pupil 444 in the form of output light 411. A polychromatic FOV of the waveguide stack is comprised of all angles of incidence a for which each color channels of the input light 401 could be coupled into at least one of the waveguides of the stack by one of the in-couplers thereof, and then coupled out of the waveguide by one of the out-couplers toward the exit pupil 444. By spreading the input light 401 among the three waveguides of the stack, the waveguide assembly 400 may be configured to support a polychromatic FOV 403 that is substantially equal or greater in width than a monochrome FOV of any one of the waveguides of the stack.

Figure 5:
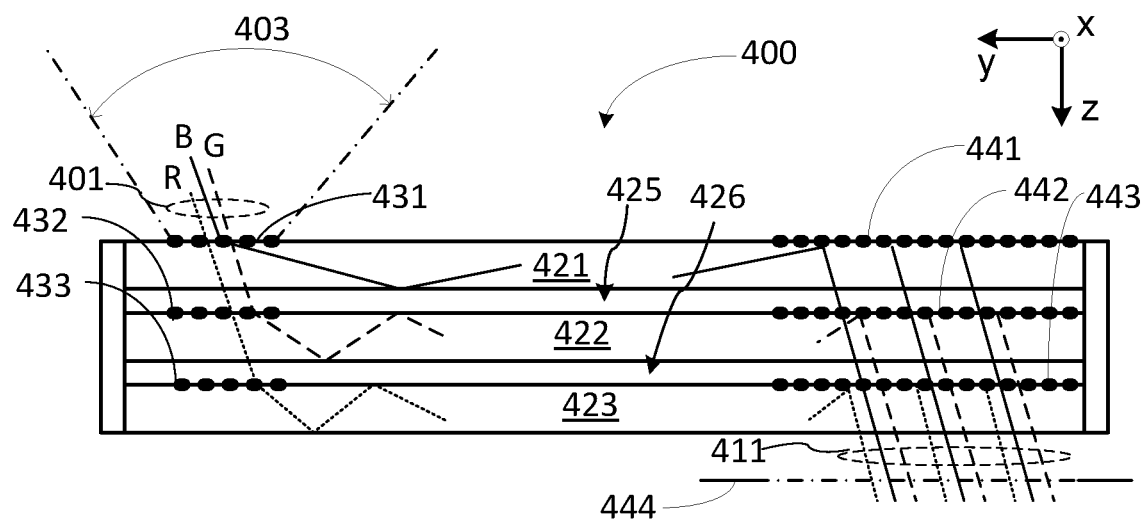
FIG. 5 is a schematic cross-section of a three-waveguide stack configured for separately transmitting three color channels within different waveguides without color cross-coupling.

In the illustrated in FIG. 5 example the waveguide assembly 400 is comprised of three waveguides arranged to form a 3-waveguide stack, with a first waveguide 421, a second waveguide 422, and a third waveguide 423, with the second waveguide 422 sandwiched between waveguides 421 and 423. Each of these waveguides may be an embodiment of the waveguide 210. Small gaps 425, 426, such as for example air gaps, may separate the first waveguide 421 from the second waveguide 422, and the second waveguide 422 from the third waveguide 423; these gaps may facilitate the TIR conditions for in-coupled light in each of the waveguides.

To facilitate the coupling of input light 401 into the waveguides, the first waveguide 421 is provided with an in-coupler 431 that may be referred to as the first in-coupler, the second waveguide 422 is provided with an in-coupler 432 that may be referred to as the second in-coupler, and the third waveguide 423 is provided with an in-coupler 433 that may be referred to as the third in-coupler. The waveguides 421, 422, and 423 are arranged in the stack with the in-couplers 431, 432, and 433 optically aligned, so that a portion of the input light 401 that is transmitted through the first in-coupler 431 without being coupled into the first waveguide 421 may be received into the second in-coupler 431, and a portion of the input light 401 that is transmitted through the first in-coupler 431 and the second in-coupler 432 without being coupled into either the first or second waveguide 421, 422 may be received into the third in-coupler 431.

Each of the in-couplers 431, 432, 433 may be an embodiment of the in-coupler 230 described hereinabove with reference to FIGS. 2A-3B, and may be in the form of, or include, a diffraction grating with a pitch $p_i$, i32 1, 2, or 3. Here $p_1$ denotes the grating pitch of the first in-coupler 431, $p_2$ denotes the grating pitch of the second in-coupler 432, and $p_3$ denotes the grating pitch of the third in-coupler 433. Each grating pitch $p_i$ defines, for a given refractive index n of the waveguide, the input FOV of the corresponding waveguide 421, 422, or 423 for each color channel of the input light, as described hereinabove with reference to the input FOV 234 of the waveguide 210. In example embodiments described herein the gratings operate in the first order, although embodiments making use of higher-order diffractions of the diffraction gratings are within the scope of the present disclosure. In some embodiments, the first-order diffraction efficiency of each grating may be for example in the range of 10% to 50%, with a fraction of the incident light, e.g. 50% to 90%, transmitted through to a next waveguide in the stack without being diffracted.

Each of the waveguides 421, 422, 423 may further include an out-coupler 441, 442, or 443 that is laterally offset from the corresponding in-coupler 431, 432, or 433. The out-couplers 441, 442, 443 may be equally offset from the in-couplers in respective waveguides so as to be optically aligned when the in-couplers 431, 432 are optically aligned in the stack. Each of the out-couplers 441, 442, 443 may be an embodiment of the out-coupler 240 of waveguide 210 described hereinabove. In example embodiments described below with reference to FIG. 6, each of the out-couplers 441, 442, 443 may be in the form of a linear grating of the same pitch as the in-coupler of that waveguide.

In some embodiments the waveguide assembly 400 may be configured so that each of the waveguide FOVs is aligned in the angle space with the target polychromatic FOV 403 of the stack at a different color channel. The waveguide assembly 400 may further be configured so that each color channel of the input light 401 reaches the exit pupil 444 along a different waveguide 421, 422, or 423, so that each waveguide transmits a single color channel. For example the first waveguide 421 may be configured to trap and guide the first color channel 311, e.g. blue, of the input light 401 collected from the target FOV 403, the second waveguide 422 may be configured to trap and guide the second color channel 312, e.g. green, of the input light 401 collected from the target FOV 403, and the third waveguide 423 may be configured to trap and guide the third color channel 313, e.g. red, of the input light 401 collected from the target FOV 403. The grating pitch $p_i$, i=1,2,3, of each in-coupler 431, 432, 433 may be selected to support the target polychromatic FOV 403 of the stack for the corresponding color channel. This can be accomplished by selecting the grating pitches for the in-couplers of the three waveguides 421, 422, 423 so that the ratio of the grating pitch $p_i$ of the in-coupler to the central wavelength of the corresponding color channel is substantially the same for each of the three waveguides:

$$\frac{p_1}{\lambda_1} = \frac{p_2}{\lambda_2} = \frac{p_3}{\lambda_3}, \tag{7}$$

Figure 6:
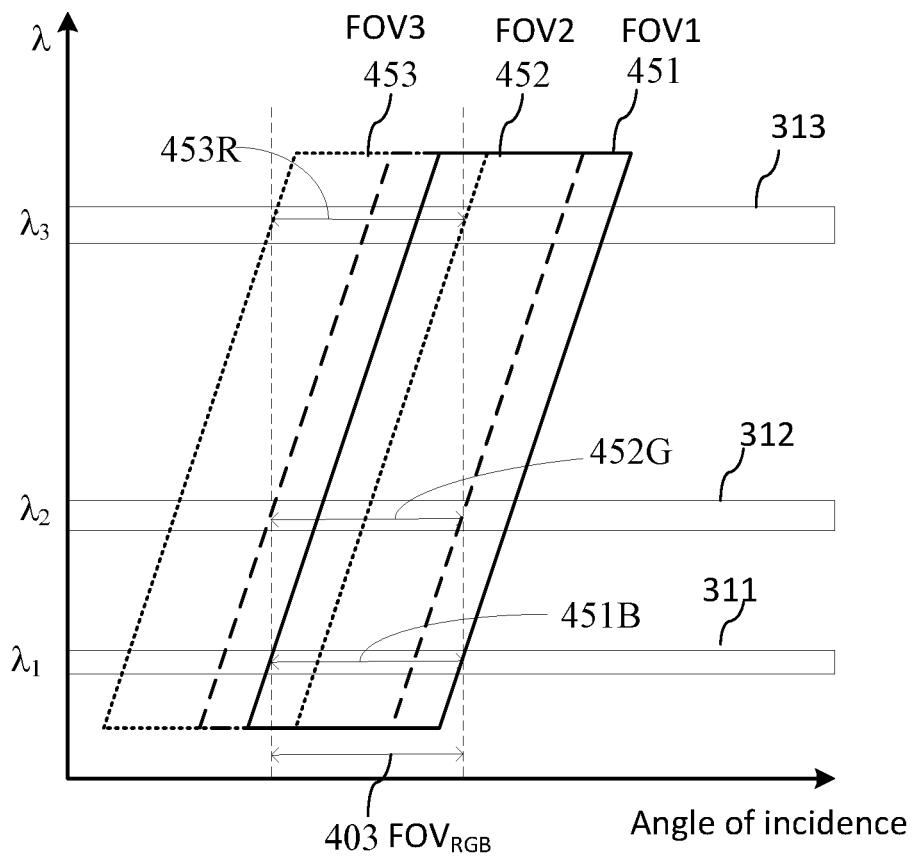
FIG. 6 is a graph schematically illustrating the input FOVs of the three waveguides of the three-waveguide stack of FIG. 5 in the ($\lambda$, $\alpha$) plane.

FIG. 6 schematically illustrates the FOVs of the three waveguides of the waveguides assembly 400 in the (α, λ) plane, as defined by their in-couplers and when the conditions of equation (7) hold. The FOV of the first waveguide 421, as defined by the grating pitch $p_1$ of the first input coupler 431, is denoted as FOV1 451, with the corresponding area outlined by solid lines. The FOV of the second waveguide 422, as defined by the grating pitch $p_2$ of the second input coupler 432, is denoted as FOV2 452, with the corresponding area outlined by dashed lines. The FOV of the third waveguide 423, as defined by the grating pitch $p_3$ of the third input coupler 433, is denoted as FOV3 453, with the corresponding area outlined by dotted lines.

The FOV of the first waveguide 421 at the first color channel 311, denoted as 451B, the FOV of the second waveguide 422 at the second color channel 312, denoted as 452G, and the FOV of the third waveguide 423 at the third color channel 313, denoted as 453R, are substantially aligned, with their common portion defined by the narrowest of the single-channel FOVs 451B, 452G, and 453B. In embodiments wherein each of the waveguides 421, 422, 423 is made of a same material which refractive index does not considerably change from channel to channel, each of the single-channel FOVs 451B, 452G, and 453B may have approximately the same width, which defines the maximum width of the target polychromatic FOV 403 of the stack.

In some embodiments the input FOVs 451, 452, and 453 of the three waveguides 421, 422 and 423 may partially overlap at some of the color channels. Accordingly, light of one color channel received at the in-coupler of the top waveguide at certain angles of incidence, may potentially be coupled into two or three of the waveguides. To block an undesired color channel from reaching the exit pupil 444 along a wrong waveguide, in some embodiments the waveguide stack 400 may include one or more color filters that may be disposed in one or both of the gaps 425, 426, either at the location of the in-couplers 431-433, or at locations of the out-couplers 441-443. By way of example, in the embodiment illustrated in FIG. 5 wherein the top waveguide 421 is configured to guide the blue color channel "B" of the input light 401 and is followed by waveguide 422 that is configured to guide the green color channel "G" of the input light 401, a blue color filter that absorbs blue light may be disposed between the first and second waveguides 421, 422 to block the blue light from entering the second in-coupler 432, a green color filter that absorbs green light may be disposed between the second and third waveguides 422, 423 to block the green light from entering the third in-coupler 433. A red color filter that absorbs red light may be disposed between the second and third waveguides 422, 423 at the location of the out-couplers to block the red light that may have been coupled into the second waveguide 422 from reaching the exit pupil 444.

In some embodiments, a substantially same target polychromatic FOV 403 may be supported by a waveguide stack composed of just two waveguides, if the waveguide stack is configured to allow at least one of the color channels, for example the second color channel 312, to reach the exit pupil 444 by way of different waveguides. Indeed, it can be deduced from FIG. 6 that the second waveguide 422 that gives rise to FOV2 452 may be unnecessary, provided that FOV1 451 and FOV3 453 overlap and that the second color channel 312 of the input light 401 is allowed to be guided by waveguides 421 and 423.

Figure 7:
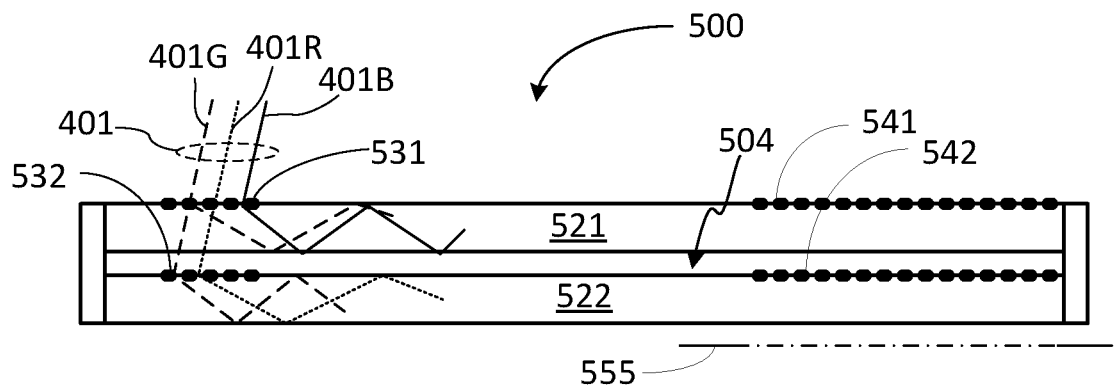
FIG. 7 is a schematic cross-section of a two-waveguide stack configured for transmitting three color channels with cross-coupling in a second color channel.

Referring to FIG. 7, there is illustrated a waveguide assembly 500 comprised of a first waveguide 521 having a first in-coupler 531 and a first out-coupler 541, and a second waveguide 522 having a second in-coupler 532 and a second out-coupler 542. Waveguides 521, 522 are arranged to form a 2-waveguide stack in which the in-coupler 531 is optically aligned with the in-coupler 532, and the out-coupler 541 is optically aligned with the out-coupler 542. A small gap 504 may be provided between the waveguides to assist in TIR.

The waveguide assembly 500 is configured to couple the second color channel 312 into both the first waveguide 521 and the second waveguide 522, so that the second color channel 312 may be guided to an exit pupil 555 within either one of the two waveguides 521, 522, depending on the angle of incidence. An arrangement in which at least one color channels of the input light is guided to a destination by different waveguides, which is referred to herein as color cross-coupling, may enable the waveguide stack to support a wider target polychromatic FOV.

Figure 8:
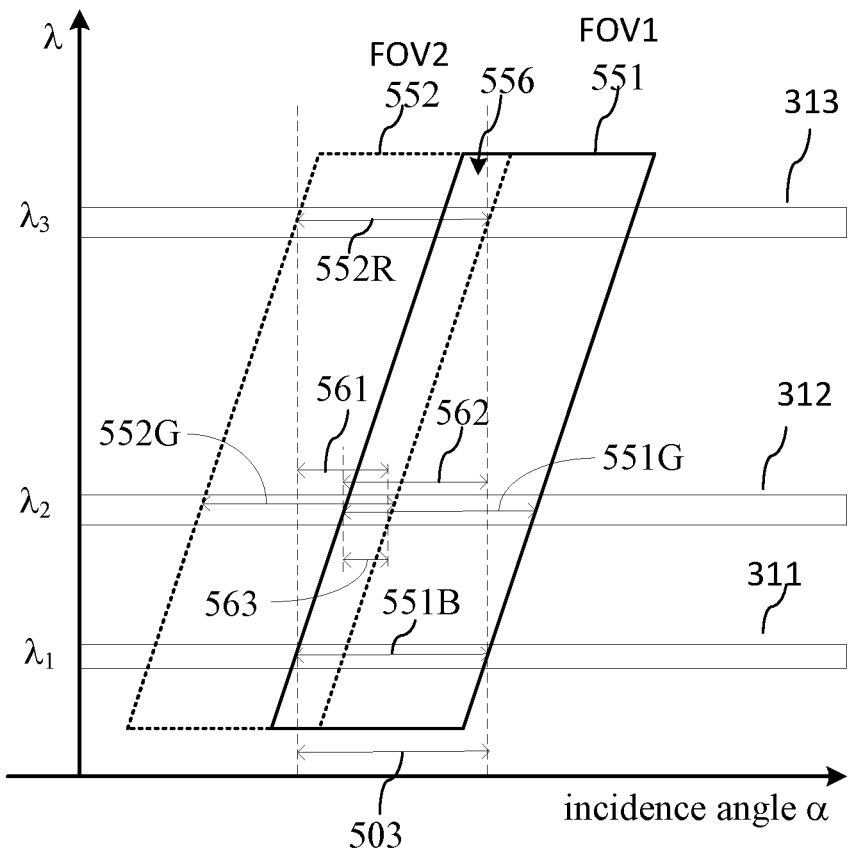
FIG. 8 is a graph schematically illustrating the input FOVs of the two waveguides of the two-waveguide stack of FIG. 7 in the ($\lambda$, $\alpha$) plane.

In FIG. 8, the FOVs of the first and second waveguides 521, 522 are illustrated as two inclined band areas 551, 552 in the plane of coordinates ($\alpha$, $\lambda$). The FOV 551 of the first waveguide 521, which is schematically outlined in FIG. 6 by solid lines, may be referred to as the first FOV and denoted FOV1 or FOV1 ($\lambda$). The FOV 552 of the second waveguide 522, which is schematically outlined in FIG. 6 by dotted lines, may be referred to as the second FOV and denoted FOV2 or FOV2 ($\lambda$). The first and second in-couplers 531, 532 may be configured so that the FOV 551 of the first waveguide 521, FOV1, partly overlaps with the FOV 552 of the second waveguide 522, FOV2, defining an overlap FOV 556.

In some embodiments the grating pitch $p_2$ of the in-coupler 532 of the second waveguide 522 and the grating pitch $p_1$ of the in-coupler 531 of the first waveguide 521 may be selected so that their ratio $p_2/p_1$ is greater than the ratio $\lambda_2/\lambda_1$ of the center wavelengths of the second (G) and first (B) color channels 312, 311. In the embodiment illustrated in FIG. 8, FOV1 551 at the first color channel 311, 551B, is shown to be aligned with FOV2 552 at the third color channel 313 (R), 552R, defining the polychromatic FOV 503 of the waveguide stack 500. In some embodiments the following relationship between the grating pitch $p_1$ of the first in-coupler 531 and the grating pitch $p_2$ of the second in-coupler 532 may hold:

$$\frac{p_1}{\lambda_1} = \frac{p_2}{\lambda_3}, \qquad (8)$$

where the equality may be understood with the accuracy of +\-10%.

At the second color channel 312 the target polychromatic FOV 503 of the stack partially overlaps each of the input FOVs 551 and 552 of the first and second waveguides 521, 522, so that at the second color channel the first waveguide 521 supports a first portion 561 of the target polychromatic FOV 503, and the second waveguide 521 supports the remaining portion 562 of the target polychromatic FOV 503, with some overlap. Thus the first waveguide 521 and the second waveguide 522 in combination support the full extent of the target polychromatic input FOV 450 of the waveguide stack 500 at all three color channels.

The waveguide assembly 500 may be viewed as a variation of the waveguide assembly 400 in which the second waveguide 422 is removed and replaced with the third waveguide 423. Accordingly, the first waveguide 521 may be similar to the first waveguide 421 of the waveguide assembly 400, with the in-coupler 531 configured to support the full width of the target FOV 503 at the first color channel 311 (B), and to support a first portion 561 of the target FOV 503 at the second color channel 312, as illustrated in FIG. 8. The second waveguide 522 may be similar to the third waveguide 423 of the waveguide assembly 400, with the in-coupler 532 configured to support the full width of the target FOV 503 at the third color channel 313 (R), and to support a second portion 562 of the target FOV 503 at the second color channel 312.

In some embodiments the waveguide assembly 500 may be absent of color filters between the first and second waveguides 521, 522. In some embodiments, the waveguide assembly 500 may be absent of at least a color filter that blocks light of the second color channel, e.g. absent of a green-absorbing color filter. In some embodiments, a color filter (not shown) configured to block light of the first color channel 311, e.g. a blue color filter configured to absorb blue light, may be placed between the first and second waveguides 521, 522 to block light of the first color channel that is not coupled into the first waveguide from being coupled into the second waveguide 522, in the absence of green-absorbing color filter in the waveguide assembly.

In operation, a light beam 401B of the first color channel 311, which is incident at the first in-coupler 531 at an angle of incidence $\alpha_0$ within the target FOV 503, is at least partially coupled by the first in-coupler 531 into the first waveguide 521, and guided by the TIR in the first waveguide toward the out-coupler 541, which is configured to decouple it out of the waveguide to propagate to the exit pupil 555. A light beam 401R of the third color channel that passes through the first waveguide 521 is at least partially coupled by the second in-coupler 532 into the second waveguide 522, and guided by the TIR in the second waveguide toward the out-coupler 542, which is configured to re-direct it to the exit pupil 555. In the absence of a green color filter in the waveguide assembly 500, a light beam 401G of the second color channel may be coupled into at least one of the first waveguide 521, or the second waveguide 522, depending on the angle of incidence thereof within the target polychromatic FOV 503. In the example illustrated in FIG. 7, the angle of incidence of the light beam 401G is within a portion 563 of the target FOV that is shared by the first and second waveguides, and therefore the light beam 401G of the second color channel 312 will be partially coupled into each of the first and second waveguides 521, 522, and will be recombined by the out-couplers 541, 542 to reach the exit pupil 555 as a single beam after propagating within each of the waveguides.

Figure 9:
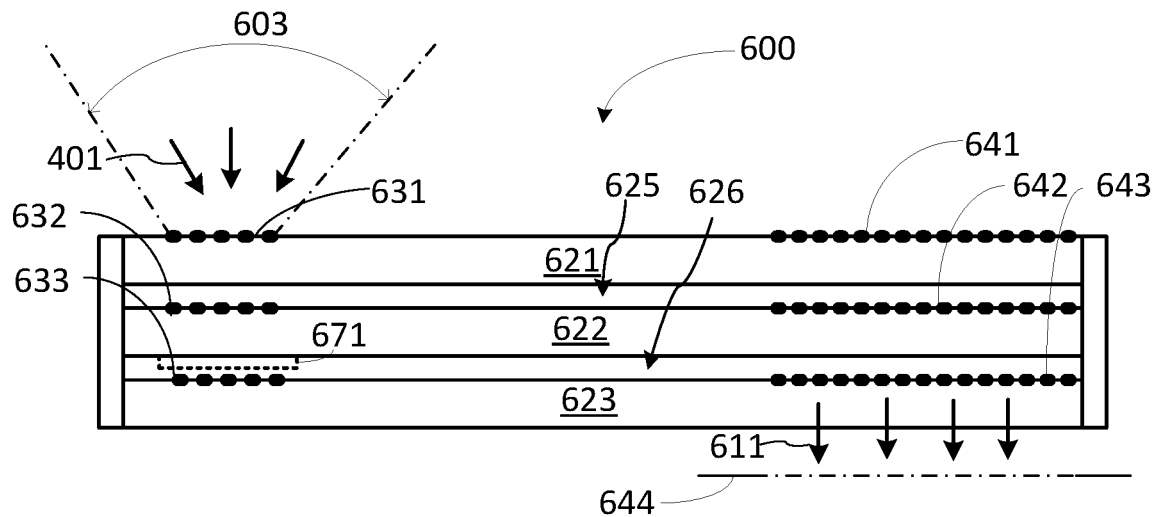
FIG. 9 is a schematic cross-section of a three-waveguide stack configured for transmitting three color channels with cross-coupling in each channel to broaden the FOV of the stack for polychromatic light.

Referring now to FIG. 9, there is illustrated a three-waveguide assembly 600 with waveguides 621, 622, and 623 disposed one over the other in succession to form a waveguide stack, according to an embodiment. Similarly to the waveguide assembly 400, each of the waveguides 621-623 is provided with an in-coupler 631, 632, or 633, each of which may be an embodiment of the in-coupler 230 described hereinabove, and may be in the form, or include, one or more diffraction gratings. In the illustrated embodiment waveguide 621, which may be referred to as the first waveguide, is a top waveguide of the stack that in operation may face a source of input light 401 (not shown). In other embodiments the waveguides 621-623 may be stacked in a different order. The in-couplers 631, 632, and 633 are optically aligned, such as described hereinabove with reference to in-couplers 431-433 of the waveguide assembly 400. The waveguides 621-623 may each be further provided with an out-coupler 641, 642, or 643, each of which may be an embodiment of the out-coupler 240 described hereinabove, and may be in the form, or include, one or more diffraction gratings. The out-couplers 641-643 are also optically aligned, such as described hereinabove with reference to out-couplers 441-443 of the waveguide assembly 400.

The waveguide assembly 600 may be similar to the waveguide assembly 400, except that the waveguide assembly 600 is configured to allow each, or at least two, of the three color channels 311-313 of the input light 401 to propagate to an exit pupil 644 within at least two of the three waveguides of the assembly. This color cross-coupling makes it possible for the waveguide stack 600 to support a target polychromatic FOV 603 that is broader than a single-channel FOV of each of the waveguides 621-623, as different portions of the polychromatic FOV 603 of the stack may be supported by different waveguides at each of the two or more color channels.

Figure 10:
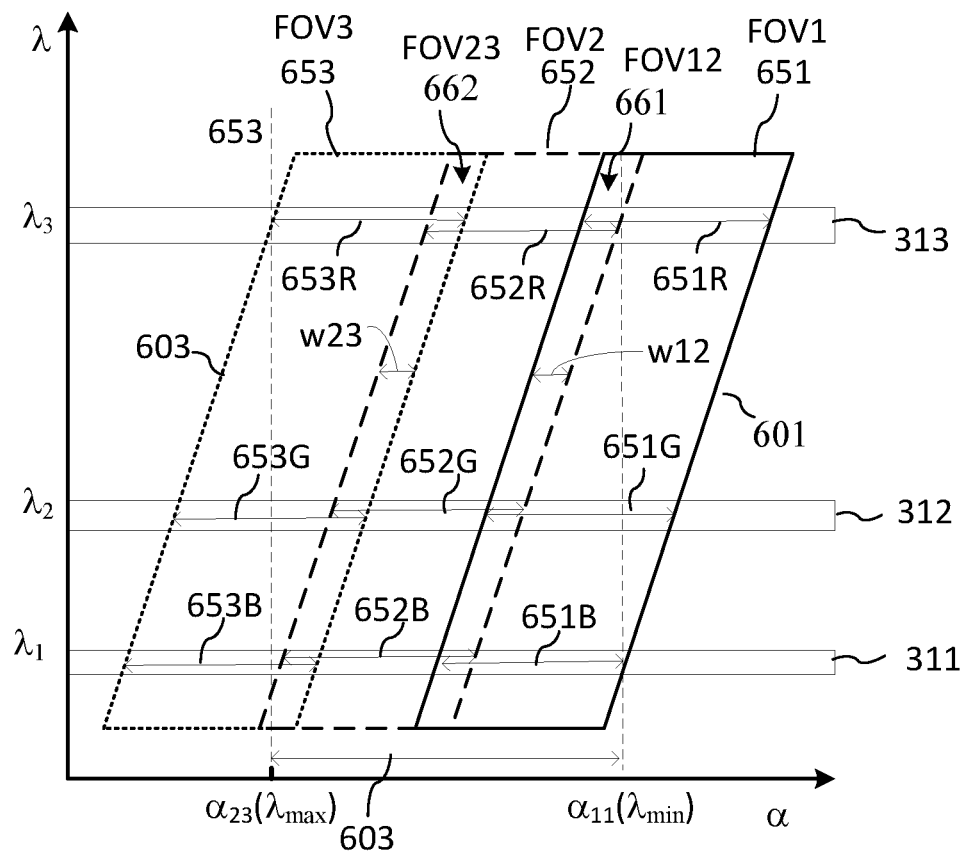
FIG. 10 is a graph schematically illustrating the input FOVs of the three waveguides of the three-waveguide stack of FIG. 9 in the ($\lambda$, $\alpha$) plane configured to support a broader FOV.

FIG. 10 schematically illustrates FOVs of the waveguides 621-623 across the wavelength spectrum of the polychromatic input light 401 according to an example embodiment. The FOV of the first waveguide 621, denoted FOV1 651, is shown in the figure as an area in the ($\alpha$, $\lambda$) plane outlined by solid lines, and is defined at least in part by the first in-coupler 631. The FOV of the second waveguide 622, denoted FOV2 652, is defined at least in part by the second in-coupler 632, and is shown in the figure as an area outlined by dashed lines. The FOV of the third waveguide 623, FOV3 653, is defined at least in part by the third in-coupler 633, and is shown in the figure as an area outlined by dotted lines. FOV1 651 may be referred to as the first FOV 651, FOV2 652 may be referred to as the second FOV 652, and FOV3 653 may be referred to as the third FOV 653. A "1D" embodiment is illustrated in which input light is incident in a plane, e.g. (y,z), and the out-couplers are configured to couple out of the waveguide each ray coupled into the waveguide by corresponding in-couplers. In such embodiments, the edges of each one of FOV1 651, FOV2 652, and FOV3 653 may be estimated from equations (3) and (4) substituting the pitch value of the corresponding waveguide.

In the example embodiment illustrated in FIG. 10, the in-couplers 631-633 are configured so that FOV1 651 and FOV3 653 are offset from FOV2 652 in opposite directions along the $\alpha$-axis. When each of the in-couplers is in the form of a linear, i.e. 1D, diffraction grating, this may correspond to selecting grating pitches of the in-couplers of the three waveguides so that $\lambda_3/p_3 < \lambda_2/p_2 < \lambda_1/p_1$, where $p_1$ is the grating pitch of the first in-coupler 631, p2 is the grating pitch of the second in-coupler 632, $p_3$ is the grating pitch of the third in-coupler 633.

In at least some embodiments the in-coupler and out-coupler gratings of waveguides 621-623 are configured so that FOV2 652 partially overlaps with both FOV1 651 to define a first shared FOV portion at one side, denoted FOV12 661, and partially overlaps with FOV3 653 at the opposite side to define a second shared FOV portion, denoted FOV23 662. In some embodiments the gratings of the waveguide assembly 600 may be configured so that the angular widths w12=$|\alpha_{11}(\lambda)-\alpha_{22}(\lambda)|$, w23=$|\alpha_{12}(\lambda)-\alpha_{23}(\lambda)|$ of these shared FOV portions FOV12 661, FOV23 662 is sufficiently small compared to the angular width of FOV2 652, w2=$|\alpha_{12}(\lambda)-\alpha_{22}(\lambda)|$, at at least one of the color channels 311, 312, 313.

The width of the polychromatic FOV 603 of the waveguide assembly 600 may be increased by suitably narrowing the shared FOV portions FOV12 661, FOV23 662, such as by adjusting the grating pitch ratio $p_1/p_3$, without eliminating the FOV overlaps. By way of example, the in-couplers and out-couplers of the waveguides 621-623 may be configured so that the width of each one of the shared FOV portions FOV21 661 and FOV23 662, w12 and w23, does not exceed 20% of the angular width of FOV2 652 at one of the three color channels 311, 312, 313. In an example embodiment, the in-couplers 631-633 may be configured so that each of w12 and w23 do not exceed 10° at one of the three color channels 311, 312, 313. In another embodiment each of w12 and w23 do not exceed 5° at one of the three color channels 311, 312, 313.

In some embodiments, the in-couplers and out-couplers may be configured so that the FOV of the first waveguide 621 at the first color channel 311, FOV1($\lambda_1$) that is indicated in FIG. 10 as 651B, extends beyond the input FOV of the third waveguide 623 at the third color channel 313, FOV3 ($\lambda_3$) that is indicated in FIG. 10 as 653R, in which case the polychromatic FOV 603 of the waveguide assembly may be wider than either of the monochrome waveguide FOVs, FOV1($\lambda_1$) or FOV3($\lambda_3$). This may correspond to a condition $|\alpha_{11}(\lambda_1)| > |\alpha_{13}(\lambda_3)|$, or to configuring the diffraction gratings of the in-couplers 631, 633 so that $$\frac{p_3}{p_1} > \frac{\lambda_3}{\lambda_1} \quad (9)$$

The waveguide assembly 600 then may be configured so that the third color channel 313 of the input light 401, which may correspond to the red component of RGB light, is partially coupled into the second waveguide 622 and partially—into the third waveguide 623, depending on the angle of incidence thereof within the polychromatic FOV 603 of the assembly.

In some embodiments the in-coupler and out-coupler gratings of the waveguides 621, 622, 623 may be further configured so that the polychromatic FOV 603 at the second color channel 312 may be supported partially by the FOV of the second waveguide, FOV2, and partially—by the FOV of the third waveguide FOV3. Thus, the second color channel 312 of input light 401 may be transmitted to the exit pupil 644 partly by the second waveguide 622 and partly—by the third waveguide 632, depending on the angle of incidence. The polychromatic FOV 603 at the first color channel 311 may be supported partially by the FOV of the second waveguide, FOV2 652, and partially—by the FOV of the first waveguide, FOV1 651. Thus, the first color channel 311 of input light 401 may be transmitted to the exit pupil 644 partly by the second waveguide 622 and partly—by the first waveguide 631, depending on the angle of incidence.

In the embodiment illustrated in FIG. 10, FOV2 652 at the second color channel 312, indicated in the figure at 652G, is offset from FOV1 651 at the third color channel 313, indicated in the figure at 651R, and FOV1 651 at the first color channel 311, indicated in the figure at 651B, is offset from FOV2 652 at the second color channel 312, indicated in the figure at 652G. This may correspond to configuring the diffraction gratings of the in-couplers 631, 632, 633 so that $$\frac{p_3}{p_2} > k_1 \frac{\lambda_3}{\lambda_2}, \text{ and } \frac{p_2}{p_1} > k_2 \frac{\lambda_2}{\lambda_1}, \quad (10)$$

where $k_1$ and $k_2$ are numerical coefficients that may each be greater than 1. In some embodiments, each of $k_1$ and $k_2$ may be about 1.2 or greater. In some embodiments $k_1$ may be different from $k_2$. Under the conditions defined by equations (10), each of the three waveguides of the waveguide assembly 600 may capture and transmit to the exit pupil 644 two color channels of input light that is receives from the polychromatic FOV 603, thereby supporting the polychromatic FOV 603 that is broader than the FOV of each one of the waveguides at any of the three color channels 311-313.

In some embodiments, the waveguide assembly 600 may be absent of color filters between the waveguides 621 and 623, so that any of the three color channels of the input light, or at least two of the color channels, may reach the exit pupil 644 by propagating in at least two of the three waveguides. In some embodiments, one or more color filters may be provided in one or both of the gaps 625, 626 so as to block a specific color channel from reaching the exit pupil 644 by means of a particular waveguide, while allowing at least two of the color channels to reach the exit pupil 644 by propagating each in at least two of the three waveguides 621, 622, 623. For example, in some embodiments a blue-blocking filter 671 can be placed in gap 626 to block blue light from entering the third waveguide 623 that may be configured for red and green color channels. In some embodiments the order of waveguides 621-623 in the stack may be different from the one shown in FIG. 9.

Waveguide assemblies of the type described hereinabove with reference to FIGS. 7-10, in which at least one of the color channels received within a target polychromatic FOV may be transported to an exit pupil by two or more waveguides, may provide significant advantages in a waveguide display such as a NED. Indeed, in some embodiments they enable to support a target FOV with fewer waveguides, thereby making the waveguide assembly thinner and/or lighter. By way of example, the waveguide assembly 500 of FIG. 7 with the waveguides having the refractive index $n \cong 1.8$ may be configured to provide a target FOV of about 40° with just two waveguides, thereby enabling a thinner assembly. In the context of this specification, "about", "substantially", and "approximately" may mean +\-10%. Also by way of example, the waveguide assembly 600 of FIG. 9 with the waveguides having the refractive index $n \cong 1.8$ may be configured to support a target FOV that can be 20% to 90% wider than with single-color waveguides, for example up to 80° for 1D embodiments, or a target FOV of about 40 degrees with lighter waveguides having the refractive n thereby reducing the weight of the assembly.

Figure 11:
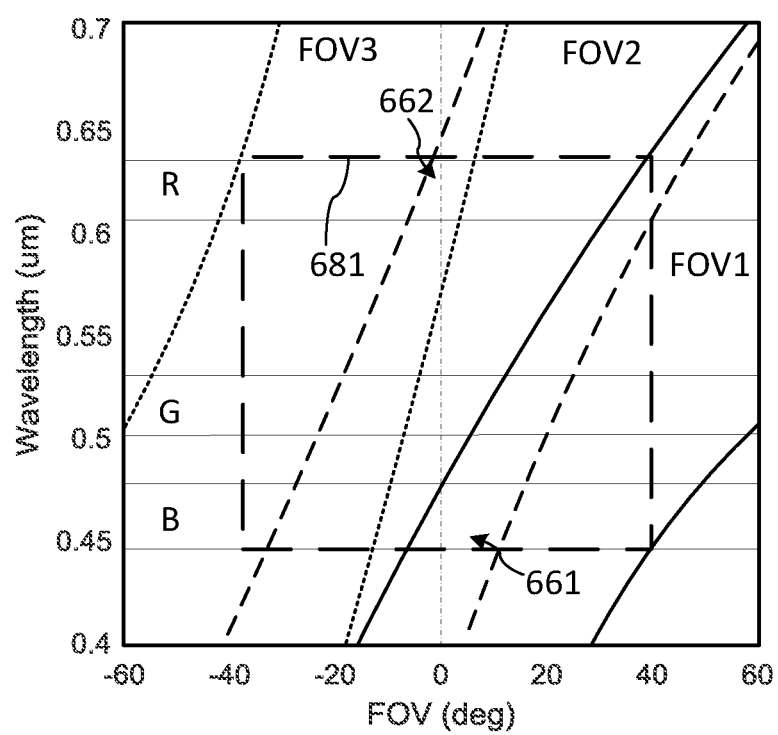
FIG. 11 is a graph illustrating the input FOVs of the three waveguides of the three-waveguide stack of FIG. 9 in the ($\lambda$, $\alpha$) plane computed for the waveguides with the refractive index n≅1.8.

In FIGS. 4, 6, 8, and 10 the edges of the FOVs of individual waveguides are schematically represented by parallel straight lines for the purpose of illustration. It will be appreciated though that the FOV edge angles $\alpha_1(k)\lambda$ and $\alpha_2(\lambda)$ are generally non-linear functions of the wavelength. FIG. 11 illustrates simulation results for the input FOVs of individual waveguides, FOV1, FOV2, and FOV3, for an embodiment of the waveguide assembly 600 with n=1.8, and the in-couplers configured to provide a target FOV of 80° for 1D propagation, as indicated in the figure by a rectangle 681. The FOV edges of FOV1 is shown by solid lines, FOV edges of FOV2—by dashed lines, and FOV edges of FOV3—by dotted lines. FIG. 11 also shows that portions of the FOVs that are shared between two waveguides, FOV12 611 and FOV23 662, become narrower at the short-wavelength range of the optical spectrum of input light.

FIGS. 4-11 describe the operation of example embodiments in one dimension, when the angle of incidence varies in one plane, e.g. (y,z), and the FOV is defined in relation to one angle of incidence, and thus may be referred to as a 1D FOV. They may directly relate to embodiments when the in-coupler and the out-coupler of each waveguide are in the form of a linear grating having collinear grating vectors $g_0$, $g_1$ that may be of substantially same magnitude, as defined by their respective pitches.

In some embodiments the input light may be directed at a waveguide assembly in different planes of incidence. In such embodiments the relevant FOVs may be defined in a two-dimensional (2D) angle space. Such a 2D FOV may be described, for example, in terms of a horizontal FOV and vertical FOV, or an X-FOV and an Y-FOV. Furthermore, in some embodiments the output coupler may include two or more linear gratings with differently oriented grating vectors, or a 2D grating that may be composed of two or more superimposed linear gratings, or a combination thereof.

Figure 12:
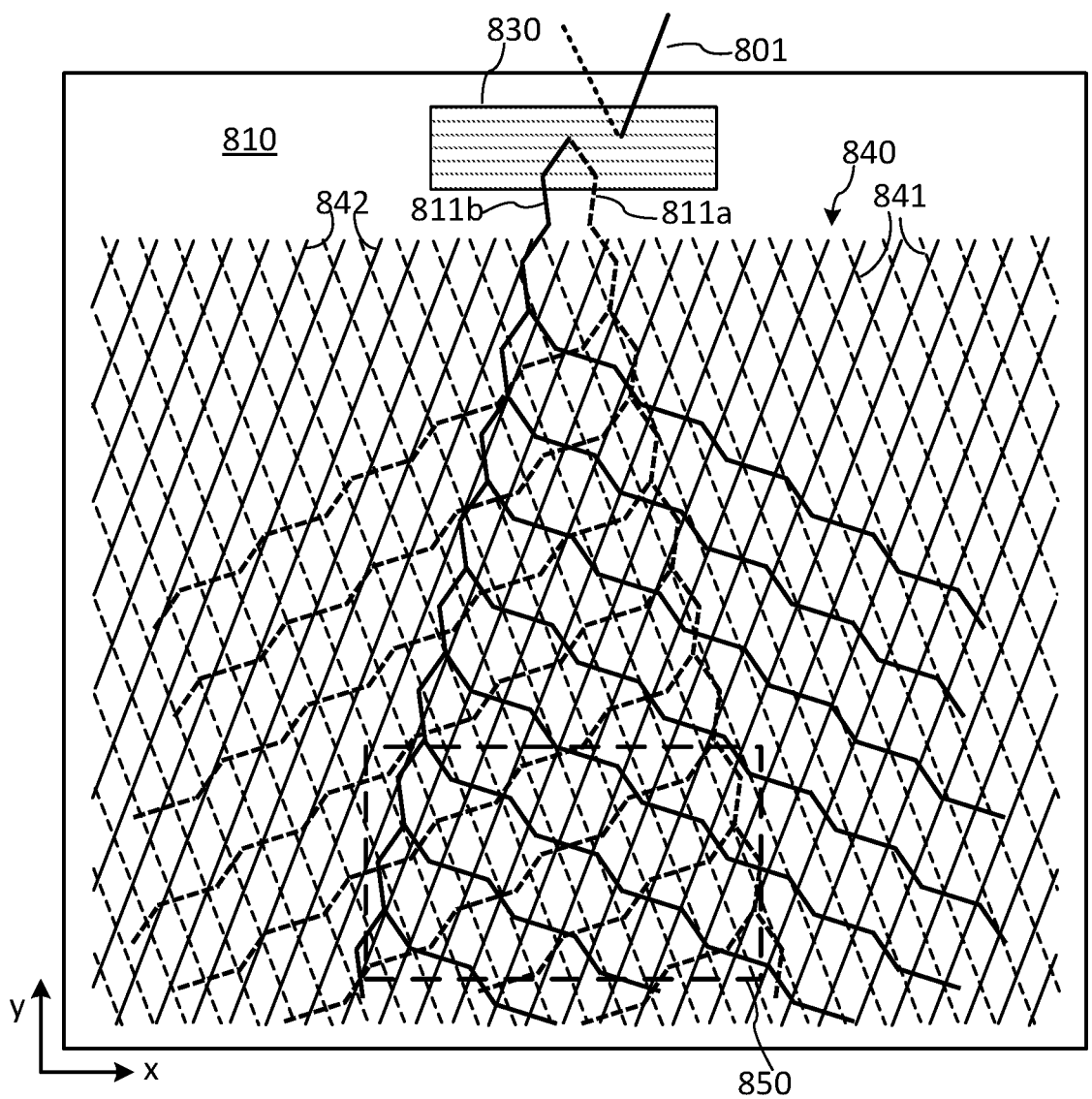
FIG. 12 is a schematic diagram of an example layout of a waveguide with a 2D FOV and a vertically aligned in-coupler.

With reference to FIG. 12, there is illustrated, in a plan view, a 2D waveguide 810 with an in-coupler 830 in the form of an input linear grating, and an out-coupler 840 comprised of two output linear diffraction gratings 841 and 842 oriented at an angle to each other. In some embodiments gratings 841 and 842 may be linear diffraction gratings formed at opposing faces of the waveguide. In some embodiments they may superimposed upon each other at either face of the waveguide, or in the volume thereof, to form a 2D grating. Light 801 incident upon the in-coupler 830 from a FOV of the waveguide may be coupled by the in-coupler 830 into the waveguide to propagate toward the out-coupler 840, expanding in size in the plane of the waveguide, as illustrated by in-coupled rays 811a and 811b. The gratings 841, 842 are configured so that consecutive diffractions off each of them re-directs the in-coupled light out of the waveguide. Rays 811a may be rays of in-coupled light that, upon entering the area of the waveguide where the out-coupler 840 is located, are first diffracted by the first grating 841, and then are diffracted out of the waveguide by the second grating 842 after propagating some distance within the waveguide. Rays 811b may be rays of the in-coupled light that are first diffracted by the second grating 842, and then are diffracted out of the waveguide by the first grating 841. An eyebox projection area 850 is indicated where the out-coupled light has optimal characteristics, for example where it has desired dimensions, for viewing; it is generally located at a distance from the in-coupler 830.

Figure 13:
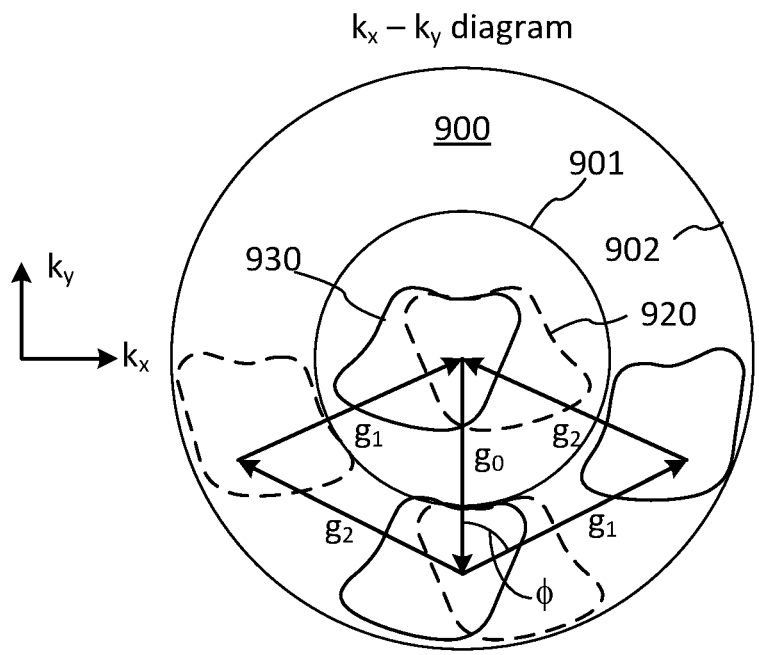
FIG. 13 is a schematic diagram illustrating the formation of a 2D FOV in the waveguide of FIG. 12 in k-space.

With reference to FIG. 13, TIR conditions for in-coupled light may be graphically represented by a ring 900 in a ($k_x$, $k_y$) plane, where $k_x$ and $k_y$ denote coordinates of the light wavevector $k=(k_x, k_y)$ in projection upon the plane of the waveguide:

$$k_x = \frac{2\pi n_m}{\lambda}\sin(\theta_x), \text{ and } k_y = \frac{2\pi n_m}{\lambda}\sin(\theta_y)$$

Here $n_m$, is the refractive index of the media where light is propagating, and the angles $\theta_x$ and $\theta_y$ define the direction of light propagation in projection on the x-axis and y-axis in the plane of the waveguide; these angles may also represent the coordinates of angle space in which a 2D FOV of the waveguide may be defined. The ($k_x$, $k_y$) plane may also be referred to herein as the k-space, and the wavevector k=($k_x$, $k_y$) as the k-vector.

The TIR ring 900 is an area of the k-space bounded by a TIR circle 901, which represents the critical TIR angle $\beta_c$, and a maximum-angle circle 902 which corresponds to the maximum in-coupled angle $\beta_{max}$. States within the TIR circle 901 represent uncoupled light, i.e. the in-coming light that is incident upon the in-coupler 830 or the light coupled out of the waveguide by one of the out-coupler gratings 841, 842. Arrows labeled $g_0$, $g_1$, and $g_2$ represent the grating vectors of the in-coupler 830, the first out-coupler grating 841, and the second out-coupler grating 842, respectively. In the figure they form two closed triangles describing two possible paths in the k-space along which the incoming light may return to the same state in the k-space after being diffracted once by each of the three gratings, thereby preserving the direction of propagation in the angle space from the input to the output of the waveguide. Each diffraction may be represented as a shift in the ($k_x$,$k_y$) plane by a corresponding grating vector. Areas 920, 930 in combination represent the FOV of the waveguide in the ($k_x$,$k_y$) plane, and may be referred to as the first and second partial FOV areas, respectively. They are defined by the in-coupler and out-coupler gratings and the refractive index of the waveguide, and represent all k-vectors of light that stay within the ring 900 after consecutive diffractions upon the input grating 830 and a first diffraction upon one of the output gratings 841, 842, and then, after a subsequent diffraction upon the other of the two output gratings, returns to a same ($k_x$,$k_y$) location in the interior disk of the ring 900 representing uncoupled light. The first partial FOV area 920 may be determined by identifying all ($k_x$, $k_y$) states which are imaged to itself by consecutive diffractions upon the input grating 830, the first output grating 841, and the second output grating 842, each of which may be represented as a shift in the ($k_x$,$k_y$) plane by a corresponding grating vector. The second partial FOV area 930 may be determined by identifying all ($k_x$, $k_y$) states which are imaged to itself by consecutive diffractions upon the input grating 830, the second output grating 842, and the first output grating 841.

Figure 14:
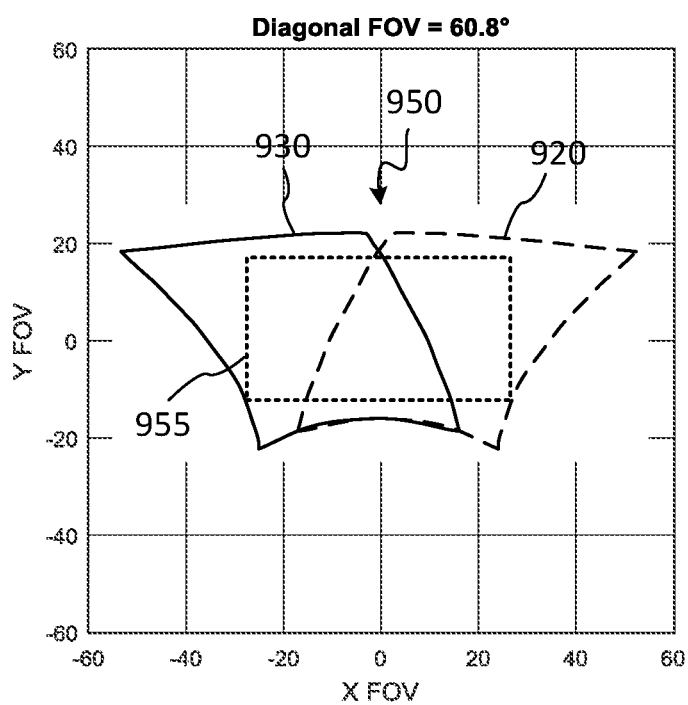
FIG. 14 is a graph illustrating the 2D FOV of the waveguide of FIG. 12 in the plane of incidence angles $\theta x$, $\theta y$ according to an embodiment.

FIG. 14 illustrates by way of example the first and second partial FOVs 920, 930 of waveguide 810 in an angle space at a particular wavelength $\lambda$, with the horizontal and vertical axes representing the angles of incidence $\theta_x$ and $\theta_y$ of input light in the x-axis and y-axis directions, respectively, both in degrees. The (0,0) point corresponds to normal incidence. In combination partial FOVs 920, 930 define a full FOV 950 of waveguide 810 at the wavelength $\lambda$, which encompasses all incident rays of input light of the selected color or wavelength that may be conveyed to a user. A rectangular area 955 which fits within the full FOV 950 may define a useful monochromatic FOV of the waveguide in some embodiments.

The position, size, and shape of each partial FOV 920, 930 in the angle space, and thus the full 2D FOV of the waveguide, depends on the wavelength $\lambda$ of the input light, on the ratios of pitches $p_0$, $p_1$, and $p_2$ of the input and output gratings to the wavelength of incoming light $\lambda$, and on the relative orientation of the gratings. Thus, the 2D FOV of the waveguide may be suitably shaped and positioned in the angle space for a particular color channel or channels by selecting the pitch sizes and the relative orientation of the gratings. In some embodiments, the output gratings 841, 842 may have the same pitch, $p_1=p_2$ and be symmetrically oriented relative to the input grating. In such embodiments the grating vectors $g_1$, $g_2$ of the first and second output gratings may be oriented at angles of +\-$\phi$ relative to the grating vector $g_0$ of the in-coupler. By way of non-limiting example, the grating orientation angle $\phi$ may be in the range of 50 to 70 degrees, for example 60 to 66 degrees, and may depend on the refractive index of the waveguide. FIG. 14 illustrates the FOV of an example waveguide with the refractive index n=1.8, $\phi \cong 60°$, and $p_1=p_2=p_3=p$, with p/$\lambda$, selected to center the FOV 955 at normal incidence.

Two, three, or more of 2D waveguides such as the waveguide 810 may be stacked to convey polychromatic image light to an exit pupil of a display, with the suitably selected grating pitches $p_i$ in each waveguide to optimize it for different color channels. In some embodiments, the grating pitches in each waveguide may be selected to provide color cross-coupling between different waveguides of the stack, thereby enabling supporting a broader polychromatic FOV that would be possible when each waveguide conveys a single color channel.

FIGS. 15A-15F schematically illustrate 2D FOVs of two waveguides, denoted WG1 and WG2, for each of the three color channels. The waveguides WG1 and WG2 may each be an embodiment of waveguide 810 described hereinabove with reference to FIGS. 12-14, and are configured to be stacked one over the other to form a two-waveguide stack, such as described hereinabove with reference to FIG. 7. For example, WG1 may be an embodiment of waveguide 521 of the waveguide stack 500 of FIG. 7, and WG2 may be an embodiment of waveguide 522 of the waveguide stack 500. The three color channels are indicated in FIGS. 15A-15F as Blue (B), Green (G), and Red (R), and may correspond to the first, second, and third color channels 311-313 described hereinabove. In each FIG. 15A-15F, the 2D FOV of the corresponding waveguide at one of the color channels is shown in the plane of incidence angles ($\theta x$, $\theta y$). It encompasses two partial FOV areas outlined by solid and dashed lines, which may correspond to the partial FOV areas 920, 930 described hereinabove with reference to FIGS. 13 and 14.

Figure 15A:
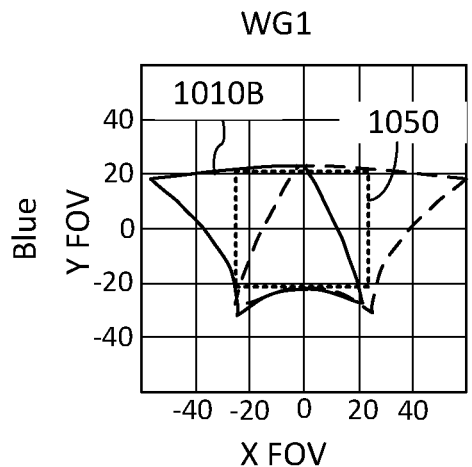
FIG. 15A is a graph illustrating the 2D FOV of a first waveguide (WG1) of an example two-waveguide stack at a first (blue) color channel in the plane of incidence angles according to an embodiment.
Figure 15D:
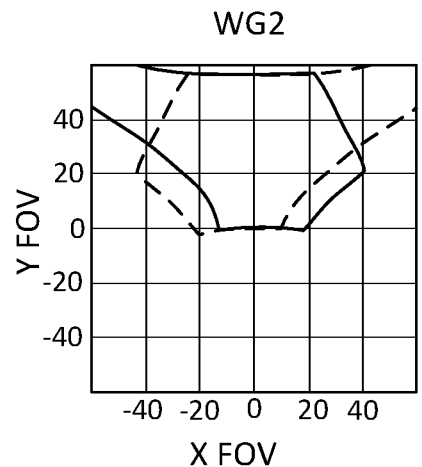
FIG. 15D is a graph illustrating the 2D FOV of a second waveguide (WG2) of the example two-waveguide stack at the first (blue) color channel in the plane of incidence angles according to the embodiment.

In the illustrated embodiment the waveguide WG1 and WG2 are configured so that in a 2-waveguide stack such as that illustrated in FIG. 7 they support a rectangular polychromatic FOV 1050 for all three color channels, with waveguides WG1 and WG2 jointly supporting the transmission of green channel of incoming light to an exit pupil. The waveguides WG1, WG2, and in particular their in-couplers and out-couplers, are configured so that the 2D FOV of the first waveguide WG1 at the blue color channel, shown in FIG. 15A at 1010B, is aligned in the angle space with the 2D FOV of the second waveguide WG2 at the red color channel, shown in FIG. 15F at 1020R, or at least substantially overlaps therewith. In some embodiments the gratings of the waveguides may be configured so that the single-channel FOVs 1010B and 1020R may be both centered at normal incidence. With the single-channel FOVs 1010B and 1020R aligned, the polychromatic FOV 1050 of the waveguide stack may be fully comprised in their common portion. In some embodiments WG1 and WG2 may be configured so that the blue-channel FOV 1010B of WG1 and the red-channel FOV 1020R of WG2 are commonly centered, for example are both centered at normal incidence, i.e. at the FOV point (0,0) in the incidence angle plane, as illustrated in FIGS. 15A and 15F.

Figure 15B:
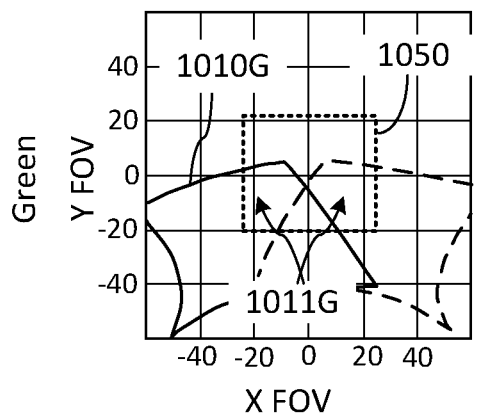
FIG. 15B is a graph illustrating the 2D FOV of the first waveguide (WG1) of the example two-waveguide stack at a second (green) color channel in the plane of incidence angles according to the embodiment.
Figure 15E:
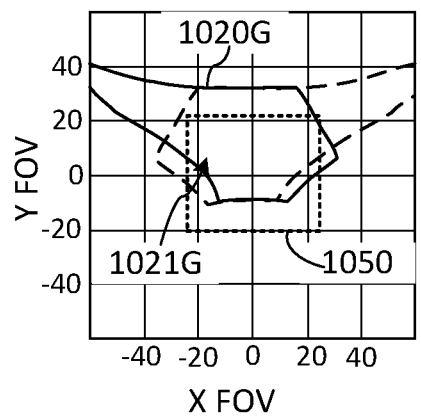
FIG. 15E is a graph illustrating the 2D FOV of the second waveguide (WG2) of the example two-waveguide stack at the second (green) color channel in the plane of incidence angles according to the embodiment.
Figure 15C:
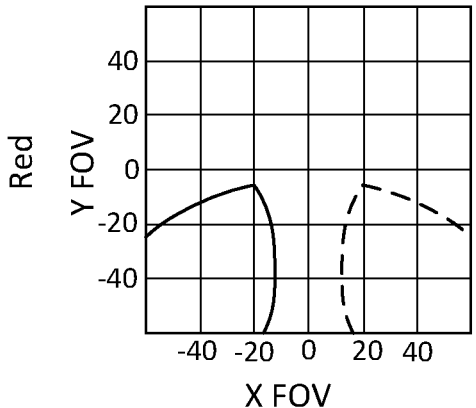
FIG. 15C is a graph illustrating the 2D FOV of the first waveguide (WG1) of the example two-waveguide stack at a third (red) color channel in the plane of incidence angles according to the embodiment.
Figure 15F:
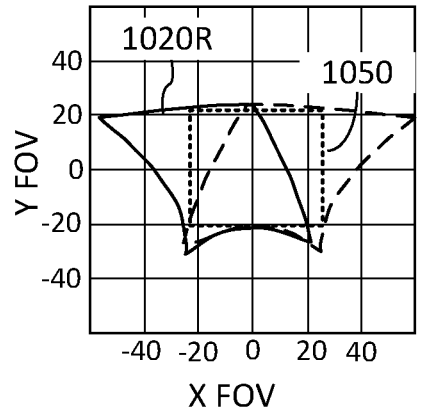
FIG. 15F is a graph illustrating the 2D FOV of the second waveguide (WG2) of the example two-waveguide stack at the third (red) color channel in the plane of incidence angles according to the embodiment.

At the green color channel, the polychromatic FOV 1050 is supported commonly by the waveguides WG1 and WG2, which are configured so that the green-channel FOVs of the waveguides WG1 and WG2, indicated at 1010G in FIG. 15B and at 1020G at FIG. 15E respectively, partially overlap and jointly support the full extent of the polychromatic 2D FOV 1050 of the waveguide stack.

In some embodiments, WG1 may be a top waveguide in the stack facing a light source. Waveguide WG2 may be disposed in the stack downstream of waveguide WG1, with the two waveguides WG1, WG2 arranged so as to allow the green color channel received at the input coupler of waveguide WG1 to be partially coupled into each one of the waveguides WG1 and WG2 for transmitting to the eyebox jointly by the two waveguides. In some embodiments, a blue-blocking filter may be disposed between the waveguides WG1 and WG2 to prevent the blue light from coupling into the second waveguide WG2. In operation, a beam of green light received by the 2-waveguide stack WG11/WG2 from a first portion 1011G (FIG. 15B) of the polychromatic FOV 1050 is transmitted to an exit pupil of the stack over the first waveguide WG1, while another green beam that is received from a second portion 1021G (FIG. 15E) of the polychromatic FOV 1050 is transmitted to the eyebox over waveguide WG2. In other embodiments, WG2 may be the top waveguide in the stack facing a light source.

FIGS. 15A-15E illustrate the 2D FOV of two waveguides having out-couplers comprised of two linear diffraction gratings, which may or may not be superimposed, in accordance with an example embodiment. In other embodiments, same or similar waveguides capable of supporting a 2D FOV may be combined to form a three-waveguide stack, generally as described hereinabove with reference to FIG. 9. Such waveguides may be configured so that light of each color channel is conveyed to an exit pupil over different waveguides, as generally described hereinabove with reference to FIGS. 10 and 11 for 1D waveguides. In some embodiments, a first waveguide of the stack may be configured to transmit blue and green channels of the image light received from an image light source, a second waveguide of the stack may be configured to transmit blue, green, and red channels of the received light, and a third waveguide of the stack may be configured to transmit the green and red channels. By enabling the incoming light of each channel to be captured and transmitted to the exit pupil within two different waveguides depending on the direction of incidence, the three waveguides in combination may support a polychromatic FOV that is broader in at least one dimension, i.e. along the X-FOV axis or the Y-FOV axis, than the FOV of any one of the waveguides at either of the three channels.

Figure 16:
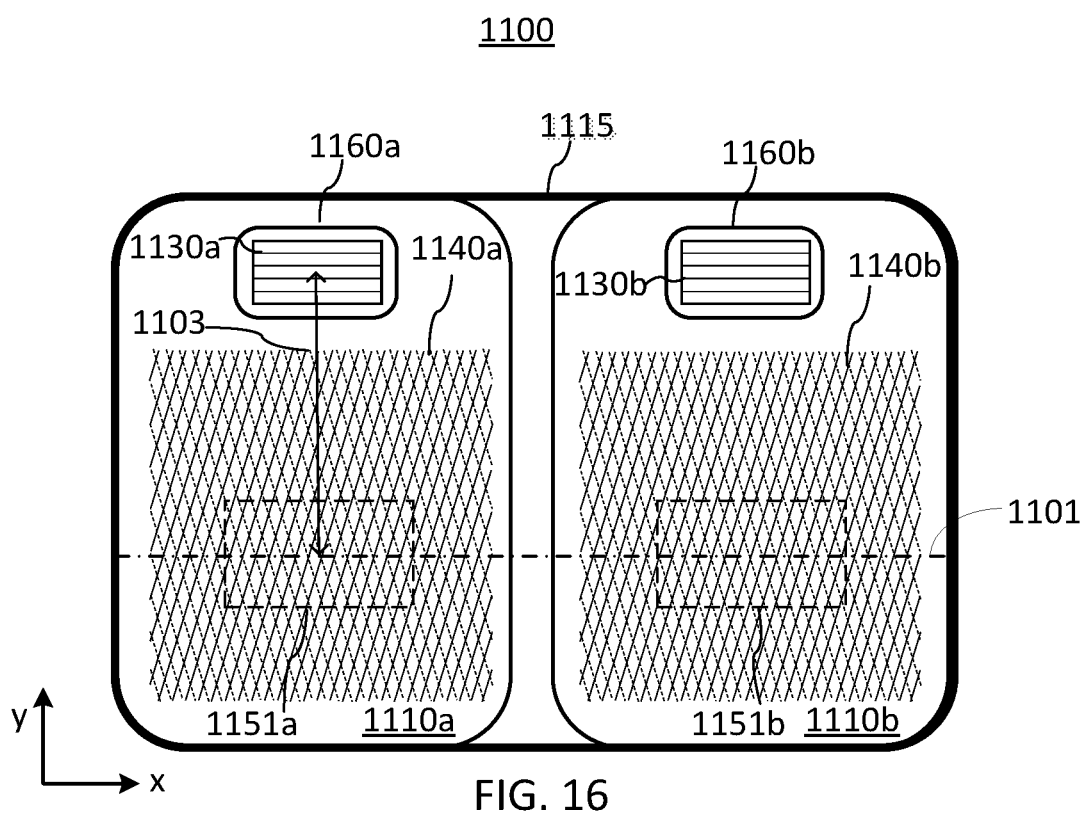
FIG. 16 is a schematic front view of a binocular NED using a waveguide assembly with the layout of FIG. 12.

FIG. 16 schematically illustrates an example layout of a binocular near-eye display (NED) 1100 that includes two waveguide assemblies 1110a, 1110b supported by a frame or frames 1115. Each of the waveguide assemblies 1110a, 1110b is configured to convey image light from a display projector 1160a or 1160b to a different eye of a user. Each waveguide assembly 1110a,b includes an in-coupler 1130a,b and an out-coupler 1140a, 1140b, with each in-coupler vertically aligned with the corresponding out-coupler. In some embodiments waveguide assemblies 1110a,b may be in the form of a waveguide stack with two or more waveguides as described hereinabove, and may be configured to provide color cross-coupling between waveguides, as described hereinabove. In some embodiments each waveguide of the stack may be an embodiment of waveguide 810 described above with reference to FIG. 12. In other embodiments each of the waveguide assemblies 1110a,b may be formed of a single waveguide. Each in-coupler 1130a,b may be in the form of a linear grating with a grating vector $g_0$, which may be identically directed but different in length for each waveguide of the stack, as defined by the grating pitch of the respective gratings. In some embodiments the grating pitches of the in-couplers of individual waveguides in the stack may be selected to provide color cross-coupling between the waveguides, for example as described hereinabove with reference to FIGS. 7-11 and 15A-15F. Each out-coupler 1040a,b may be in the form of two 1D gratings, with the grating vectors $g_1$ and $g_2$ of the respective gratings oriented at an angle to each other. These gratings may be disposed at opposing faces of each waveguide, or superimposed at one of the waveguide faces. The out-coupler grating vectors $g_1$ and $g_2$ may be different in length for each waveguide, matching the corresponding in-couplers.

Each out-coupler 1140a,b includes an eyebox projection area 1151a,b, which may also be referred to as the exit pupil of the waveguide, and from which in operation the image light is projected to an eye of the user. An eye box is a geometrical area where a good-quality image may be presented to a user's eye, and where in operation the user's eye is expected to be located. The eyebox projection areas 1151a, 1151b may be disposed on an axis 1101 that connects their centers. The axis 1101 may be suitably aligned with the eyes of the user wearing the NED, or be at least parallel to a line connecting the eyes of the user, and may be referred to as the horizontal axis (x-axis). In the illustrated embodiment the in-couplers 1130a, 1130b are disposed vertically over the corresponding eyebox projection areas 1151a, 1151b with an offset 1103 along the vertical dimension (y-axis), which may be for example in the range of 20-40 mm. This offset may result in a relatively large size of the NED in the vertical dimension, which may be undesirable.

Figure 17A:
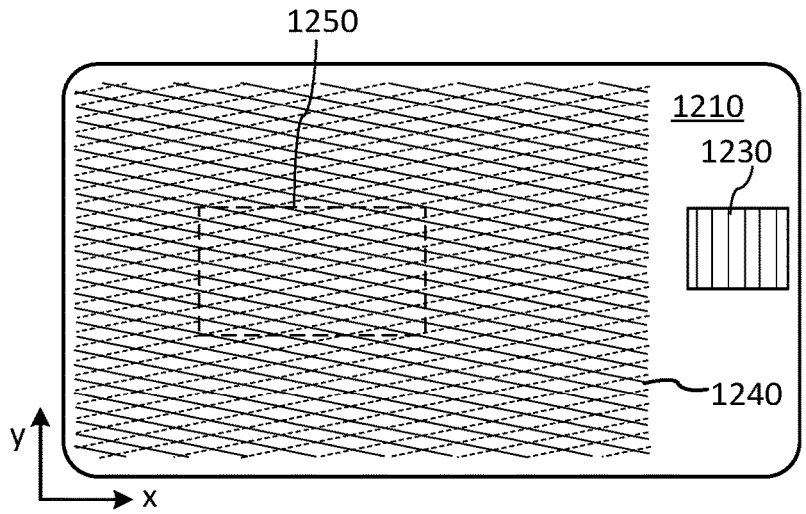
FIG. 17A is a schematic diagram illustrating an example layout of a waveguide assembly with the in-coupler and out-coupler side by side.
Figure 17B:
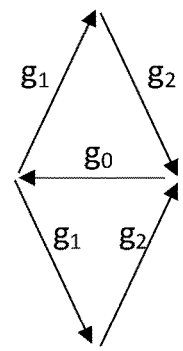
FIG. 17B is a schematic diagram illustrating a vector diagram of grating vectors in the example layout of FIG. 17A.

FIG. 17A schematically illustrates an example layout, in a plan view, of a waveguide assembly 1210. The waveguide assembly 1210 may be in the form of, or include, a stack of two or more waveguides. In this embodiment the in-couplers and out-couplers of the waveguides, indicated at 1230 and 1240, respectively, are horizontally offset, which increases the size of the assembly horizontal dimension but decreases it in the vertical dimension. Each in-coupler 1230 may be in the form of a 1D grating with a grating vector $g_0$, which may be identically directed but different in length for each waveguide of the stack, as defined by the grating pitch of the respective gratings. Each out-coupler 1240 may be in the form of two 1D gratings, with the grating vectors $g_1$ and $g_2$ of the respective gratings oriented at an angle to each other. These gratings may be disposed at opposing faces of each waveguide, or superimposed at one of the waveguide faces to form a 2D grating. The out-coupler grating vectors $g_1$ and $g_2$ may be different in length for each waveguide, matching the corresponding in-couplers. For each waveguide of the stack, the gratings of the in-coupler and out-coupler may be configured to satisfy a vector diagram illustrated in FIG. 17B. In some embodiments the grating pitches of the in-couplers and out-couplers of individual waveguides in the stack may be selected to provide color cross-coupling between the waveguides, for example as described hereinabove with reference to FIGS. 7-11 and 15A-F. The eyebox projection area 1250 is horizontally offset from the in-coupler 1230.

Figure 17C:
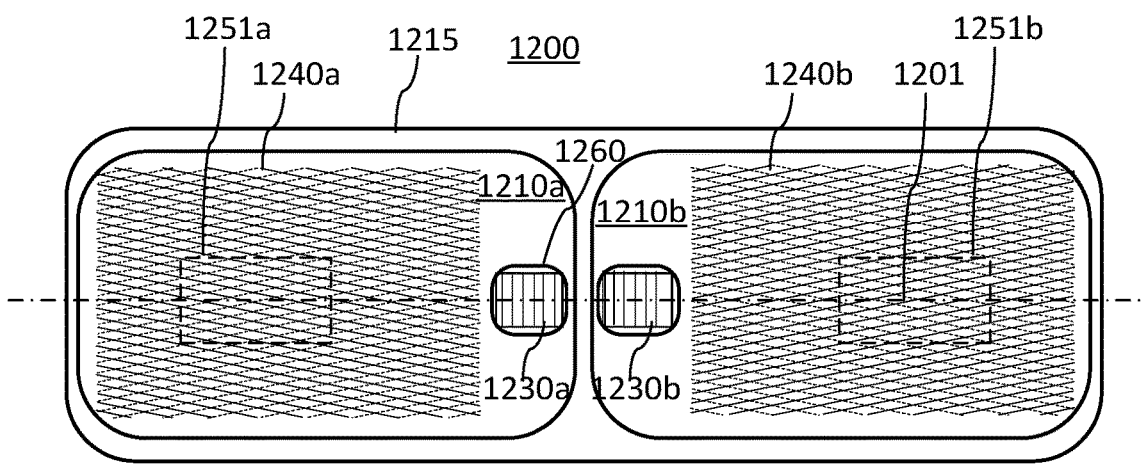
FIG. 17C is a schematic plan view of a NED using two waveguide assemblies with the layout of FIG. 17A and the in-couplers at the middle.

FIG. 17C schematically illustrates a NED 1200 utilizing two waveguide assemblies 1210a, 1210b, one for each eye of a user, supported by a frame 1215. The waveguide assemblies 1210a,b have the layout illustrated in FIG. 17A, with the in-couplers 1230a and 1230b disposed horizontally between the out-couplers 1240a and 1240b, and are centered on a same horizontal axis. The waveguide assemblies 1210a, b, each of which may be an embodiment of the waveguide assembly 1210 with the same in-out coupler layout for each eye, may be configured so that the eyebox projection areas 1251a,b are positioned in front of the user's eyes. The in-couplers 1230a,b may be provided with a common microdisplay projector or two separate micro-display projectors 1060, which may be disposed to project image light toward the corresponding in-couplers 1230a or 1230b. With the in-couplers 1230a,b disposed at the sides of the out-couplers 1240a,b, NED 1200 may be smaller than the NED 1100 in the vertical dimension, which may be a better fit to a human face. In the illustrated embodiment, the in-couplers 1230a, 1230b are disposed at proximate sides of the out-couplers 1240a,b and positioned between the out-couplers 1240a and 1240b. In a variation of this embodiment, the in-couplers 1230a and 1230b may be disposed at opposite sides of the respective out-couplers 1240a and 1240b, so that the out-couplers 1240a and 1240b are positioned between the in-couplers 1230a and 1230b.

FIG. 18A schematically illustrates an example layout, in a plan view, of a waveguide assembly 1310 according to an embodiment. In this layout, an in-coupler or in-couplers 1330 are diagonally offset from an eyebox projection area 1350 of an out-coupler or out-couplers 1340, i.e. offset in both horizontal and vertical dimensions, and are disposed at a smaller side of the out-coupler(s). The waveguide assembly 1310 may be in the form of, or include, a stack of two or more waveguides, each with a corresponding in-coupler 1330 and out-coupler 1340. Each in-coupler 1230 may be in the form of a 1D grating with a grating vector $g_0$, which may be identically directed but different in length for each waveguide of the stack, as defined by the grating pitch of the respective gratings. In some embodiments the grating pitches of the in-couplers of individual waveguides in the stack may be selected to provide color cross-coupling between the waveguides, for example as described hereinabove with reference to FIGS. 7-11, 15A-15E. Each out-coupler 1340 may be in the form of two linear gratings, with the grating vectors $g_1$ and $g_2$ of the respective gratings oriented at an angle to each other. These gratings may be disposed at opposing faces of each waveguide, or superimposed at one of the waveguide faces. The out-coupler grating vectors $g_1$ and $g_2$ may be different in length for each waveguide, matching the corresponding in-couplers. For each waveguide of the stack, the gratings of the in-coupler and out-coupler may be configured to satisfy a vector diagram illustrated in FIG. 18B, with the grating vector $g_0$ of the in-coupler grating(s) 1330 directed at an angle γ to a horizontal axis 1250 of the eyebox projection area 1350. In some embodiments, γ is less than 45 degrees, and may be for example in the range of 10 to 40 degrees, with the out-coupler 1330 positioned at a smaller side of the out-coupler 1340.

FIG. 18C schematically illustrates a NED 1300 utilizing two waveguide assemblies 1310a, 1310b, one for each eye of a user, supported by a frame 1315. The waveguide assemblies 1310a,b have the layout illustrated in FIG. 18A, with the in-couplers 1330a and 1330b diagonally offset from the eyebox projection areas 1351a,b of the respective out-couplers 1340a,b. In the illustrated embodiment the in-couplers 1330a,b are positioned between the out-couplers 1340a and 1340b, and above the horizontal axis 1301 on which the eyebox projection areas 1351a, 1351b are disposed. In other embodiments, the in-couplers 1330a,b may be positioned generally between the out-couplers 1340a and 1340b, and below the horizontal axis 1301 of the eyebox projection areas. In some embodiments the in-couplers 1330a,b may be positioned at opposite sides of the out-couplers 1340a and 1340b, either above or below the horizontal axis 1301, with the out-couplers positioned generally between the in-couplers. Such layouts, in which the in-couplers are diagonally offset from the eye-box projection areas of the out-couplers and are positioned at least partially within the vertical extent of the out-couplers, may have the advantage of a smaller vertical dimension and more ergonomic positioning of the in-couplers and the associated micro-displays 1360 relative to features of a human face.

It may be desired that any two rays of input light that are incident upon a waveguide assembly parallel to each other, will also all exit the waveguide assembly through the out-couplers as parallel rays. For the waveguides which main opposing faces are perfectly parallel to each other, this can be accomplished by suitably matching the diffraction gratings of the out-coupler to those of the in-coupler, for example to satisfy the sum-to-zero condition (5) for the grating vectors of the in-coupler and out-coupler of the same waveguide.

Figure 19:
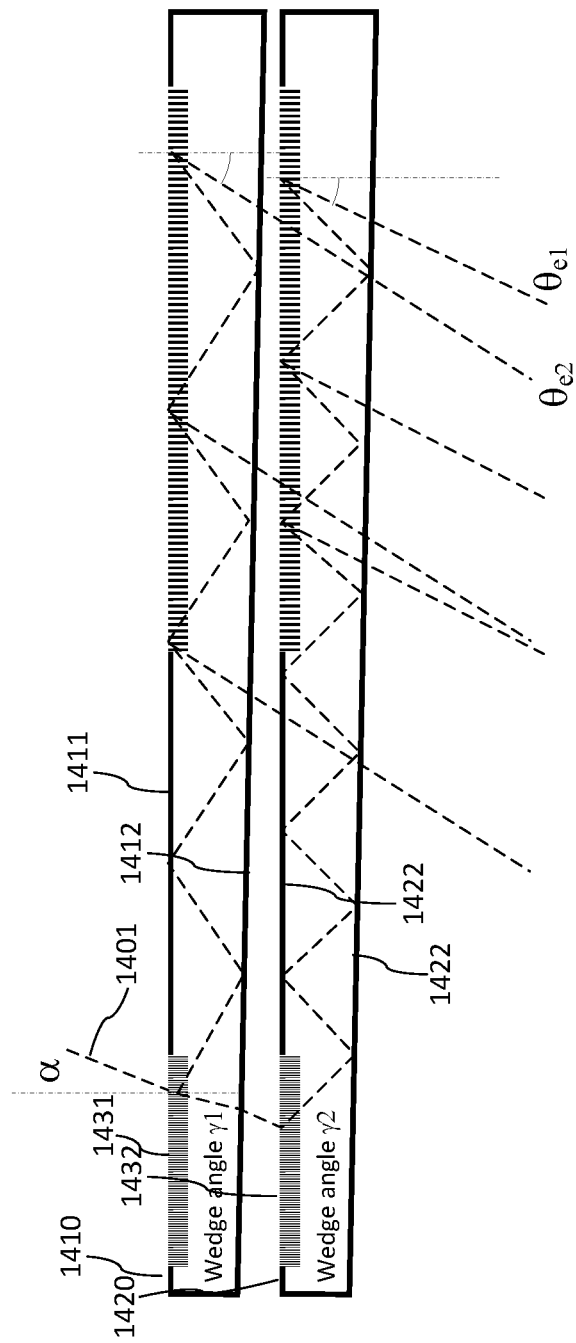
FIG. 19 is a schematic cross-sectional diagram of a two-waveguide stack illustrating the divergence of light beams of a same color ("color splitting") after propagating in waveguides with differing wedge angles.

Referring to FIG. 19, there is illustrated a portion of a waveguide stack assembly with a first waveguide 1410 disposed over a second waveguide 1420, each including an in-coupler and an offset out-coupler, which are pair-wise optically aligned. Waveguides 1410, 1420 may be each an embodiment of any of the waveguides described hereinabove that may be used to convey image light to an exit pupil of a display system. However, in real-life implementations the main faces 1411, 1412 and 1421, 1422 of each of the waveguides 1410, 1420 in the waveguide stack may not be perfectly parallel to each other. In FIG. 19 this non-ideality is represented with non-zero wedge angles $\gamma_1$ and $\gamma_2$ between the opposing faces of the corresponding waveguides. These wedge angles may differ for the two waveguides, $\gamma_1 \neq \gamma_2$, resulting in differing exit angles $\theta_{e1}$ amd $\theta_{e2}$ from the out-couplers. Since the in-couplers 1431, 1432 are configured to support differing input FOVs, for example have differing grating pitches, a light beam 1401 of a particular color channel will be diffracted into the waveguides by the in-couplers at different angles, and will experience different numbers of TIR reflections off the waveguide faces on their way to the out-couplers of the corresponding waveguides. Accordingly, a light beam of a particular color channel that is coupled into both of the waveguides 1410, 1420, will exit these waveguides at different exit angles $\theta_{e1}$ and $\theta_{e2}$. These exit angles may be estimated based on the wedge angles and the number of bounces $N_1$, $N_2$ the in-coupled rays experiences in each waveguide. The angular offset $\Delta\theta$ between them may be estimated as $$\Delta\theta = |\theta_{e1} - \theta_{e2}| = |N_1 \cdot \gamma_1/2 - N_2 \cdot \gamma_2/2|$$

For thin waveguides the number of bounces $N_i$ in each waveguide may be large, so that even small wedge angles may result in a rather large angular offset $\Delta\theta$ between the exit rays of the same color. Depending on the waveguide fabrication tolerances, this undesired angular offset between same-color light beams exiting different waveguides can easily exceed angle inaccuracy that may be allowed in a waveguide display such as a NED. The exit angles $\theta_{e1}$ and $\theta_{e2}$ can be theoretically matched if $$N_1 \cdot \gamma_1 = N_2 \cdot \gamma_2$$

However, selecting waveguide pairs based on wedge angles may be technically complicated. Furthermore, the wedge angle of a waveguide fabricated using a conventional technology, such as a glass slab waveguide, may vary across the waveguide in a manner that may be difficult to predict or measure.

Accordingly, an aspect of the present disclosure provides a method for fabricating a waveguide stack in which a polychromatic FOV of the stack is supported by coupling of a color channel into two or more waveguides, and in which the waveguides forming the stack are selected to be matched with respect to the exit angles.

In at least some embodiments, the method may include providing, for example by acquiring or producing, a plurality of first waveguides and a plurality of second waveguides, each comprising an in-coupler and an offset out-coupler. The in-couplers and the out-couplers may be nominally of identical first respective configurations for each first waveguide, and nominally identical second respective configuration for each second waveguide. Thus, each first waveguide may be nominally characterized by a first FOV, and each second waveguide may be nominally characterized by a second, different, FOV. Each first waveguide may be configured for transmitting a first color channel in the waveguide stack, for example blue, and each second waveguide may be configured for transmitting at least one of a second or third color channels, for example at least one of green or blue.

The first waveguides may be for example waveguides 521 or 621, or the first (WG1) embodiment of waveguide 810, and the second waveguides may be for example waveguides 522 or 622, or the second (WG2) embodiment of waveguide 810. The FOVs of the first and second waveguides may each support a target polychromatic FOV of the stack for at least one color channels, for example green, and at least partially overlap to define a first shared FOV, for example as indicated at 556 in FIG. 8, or at 661 in FIG. 10.

In some embodiments the method may further include combining, in a waveguide stack, a first waveguide from the plurality of first waveguides with a second waveguide from the plurality of second waveguides that is matched to the first waveguide with respect to a light exit angle. This may include positioning the first waveguide over the second waveguide so as to allow light of the second color channel received at the input coupler of one of the first and second waveguides to be at least partially coupled into the other of the first and second waveguides by the input coupler thereof.

Figure 20:
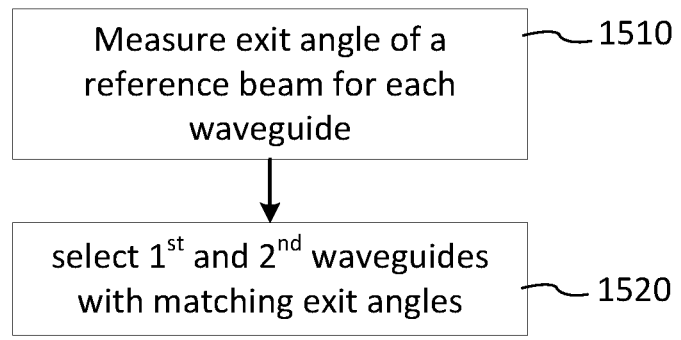
FIG. 20 is a flowchart illustrating general steps of a method for fabricating a waveguide stack with color cross-coupling to reduce the color splitting in non-ideal waveguides.
Figure 21:
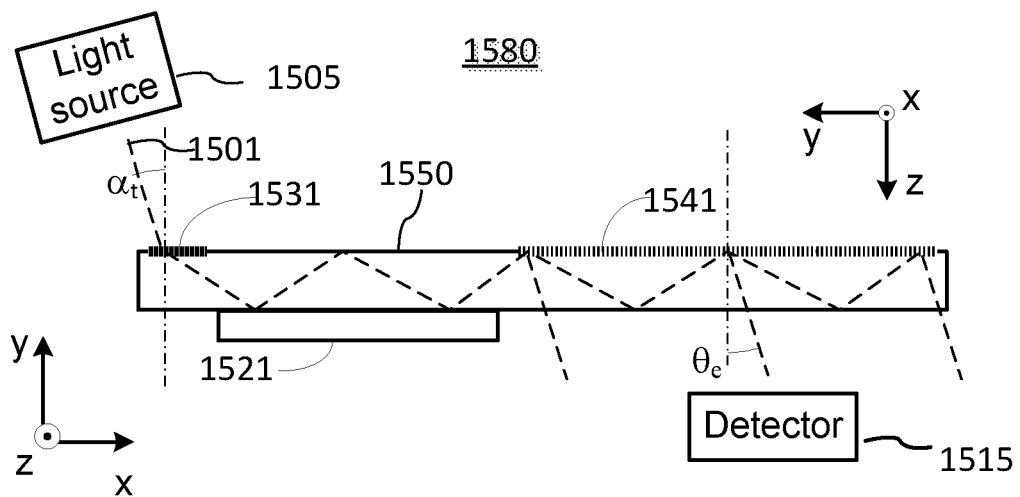
FIG. 21 is a schematic diagram illustrating a setup for measuring exit angles of a reference beam for display waveguides in accordance with the method of FIG. 20.

Referring to FIGS. 20 and 21, the process of fabrication of the waveguide stack generally outlined above may include a method 1500 for selecting waveguides for a waveguide stack, which in turn may include: (1510) determining an exit angle $\theta_e$ of a reference beam 1501 for each waveguide from the plurality of first waveguides and the plurality of second waveguides, and (1520) selecting one of the first waveguides and one of the second waveguides for the stack with matching exit angles $\theta_e$. Step 1520 may include selecting first and second waveguides for which the exit angles measured at step 1510 match with a desired accuracy, i.e. don't differ by more than a threshold angle error $\delta\theta_{th}$. In some embodiments, this threshold angle error may correspond to an angle subtended by a fraction of a pixel pitch, for example a quarter of the pixel pitch, of an electronic display in a display system in which the waveguide stack is to be used. In some embodiments $\delta\theta_{th}$ may be in the range between 0.1° and 0.001°. By way of example, $\delta\theta_{th}$=+\−0.5 arcmin. Step or operation 1510 may include projecting the reference beam upon the in-coupler of the waveguide under test at a reference angle, which may be the same for each first and second waveguides.

In some embodiments the reference beam 1501 directed at the in-coupler of each first or second waveguide may be at a wavelength within a color channel in a middle of the optical spectrum of intended operation, for example in the second color channel 312 described hereinabove. Example embodiments described below will be described with reference to RGB light for clarity, for which the test beam 1501 may be a beam of green light (G). However the method is not limited thereto, and extensions to other color schemes, or the use of a reference beam of a different color or colors, will be apparent on the basis of the present description.

Referring to FIG. 21, an example waveguide testing setup 1580 may include a support 1521 for holding a waveguide to be tested in a pre-determined position, with a waveguide 1550 shown for illustration. A light source 1505 may further be included, which is configured to emit a reference light beam 1501 at a test wavelength $\lambda_t$, the reference light beam 1501 impinging upon an in-coupler 1531 of the waveguide 1550 under test at a desired test angle $\alpha_r$. The test wavelength $\lambda_1$ may also be referred to as the first reference wavelength. A detector 1515 may be disposed to receive the reference beam, or at least a portion thereof, after it propagates in the waveguide 1550 under test and exits from the waveguide by means of the waveguide out-coupler 1541. The light source 1505 may be, for example but not exclusively, a LED-based or a laser-based light source; generally any light source capable of emitting a collimated light beam 1501 at the desired reference wavelength(s) can be used. The detector 1515 may be for example in the form of a detector array that has a sufficient resolution and is positioned so as to be able to resolve changes in the exit angle $\theta$ that are preferably smaller than $\delta\theta_{th}$.

In embodiments wherein the waveguides to be test are intended for a 1D operation, the detector 1515 may be in the form of a linear detector array. In embodiments wherein the waveguides under test are intended for 2D operation, the detector 1515 may be in the form of a 2D detector array, and the setup 1580 may be configured to measure the exit angle $\theta$ in two different planes, for example it may be configured to measure an exit angle $\theta_x$ in the (x,z) plane and an exit angle $\theta_y$ in the (y,z) plane, where the z-axis is directed normally to the waveguide towards the exit pupil.

Figure 22:
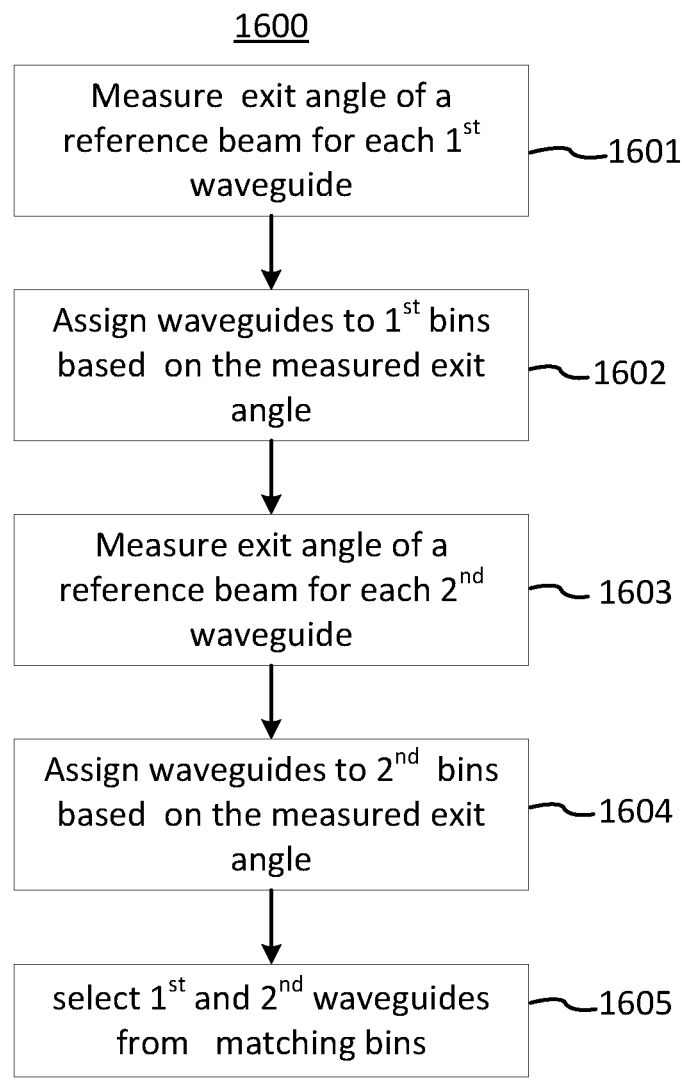
FIG. 22 is a flowchart of an embodiment of the method of FIG. 20 using waveguide binning based on measured exit angles.

Referring to FIG. 22, there is illustrated a flowchart of a method 1600 for selecting a pair of waveguides for a waveguide stack with color cross-coupling, which may be viewed as an embodiment of method 1500. Method 1600 may be preceded by providing, for example by acquiring or fabricating, a plurality of first waveguides and a plurality of second waveguides, each comprising an in-coupler and an out-coupler, as described hereinabove. The in-couplers and the out-couplers may be of nominally identical first configuration for each first waveguide, and of nominally identical second configuration for each second waveguide.

The first and second waveguides may be for example waveguides 521 and 522, 621 and 622, or 622 and 623, or waveguides WG1 and WG2 described hereinabove with reference to FIGS. 15A-15F. The in-couplers and out-couplers of the first waveguides may define a first FOV, such as FOV1 of FIG. 8 or 10, that at least partially overlaps a target polychromatic FOV of the stack at a first and second color channels, for example blue and green. The in-couplers and out-couplers of the second waveguides may define a second FOV, such as FOV2 of FIG. 8 or 10, that at least partially overlaps the target polychromatic FOV of the stack at the second and third color channels, for example green and red.

The second FOV partially overlaps the first FOV in at least the second color channel, e.g. green, to define a first shared FOV, for example as indicated at 556 in FIG. 8, or at 661 in FIGS. 10 and 11.

In accordance with an embodiment, method 1600 may include the following steps or operations: (1601) measuring an exit angle $\theta_e$ of a reference beam for each of the first waveguides from the plurality of first waveguides; (1602) assigning each, or at least some, of the first waveguides to one of a plurality of first bins based on the measured exit angle $\theta_e$; (1603) measuring the exit angle $\theta_e$ of a reference beam for each of the second waveguides from the plurality of second waveguides; (1604) assigning each, or at least some, of the second waveguides to one of a plurality of second bins based on the measured exit angle $\theta_e$; and, selecting first and second waveguides from matching first and second bins, i.e. bins corresponding to matching ranges of the exit angles.

Steps or operations 1601 and 1603 may include illuminating the in-coupler of the waveguide under test with the reference beam 1501 of the same color, or the same reference wavelength, at a same reference incidence angle $\alpha_r$. The reference beam may be selected so as to be within the shared portion of the input FOV of the first and second waveguides, such as indicated at 563 in FIG. 8, or 661 in FIG. 10. By way of example, the reference beam 1501 may be a beam of green light at a normal incidence to the waveguide.

Steps or operations 1602, 1604 may include assigning the waveguides to different logical bins in dependence on the measured values of the exit angle, and/or placing the waveguide into different physical bins, e.g. different containers, based on the measured exit angle. By way of example, in step or operation 1602, first waveguides with the measured $\theta$ in the range $[\theta_{min}, \theta_{min}+\delta\theta_{th})$ may be assigned to bin (A,1), first waveguides with the measured exit angle $\theta$ in the range $[\theta_{min}+\delta\theta_{th}, \theta min+2\delta\theta_{th})$ may be assigned to bin (A,2), and so on, so that first waveguides with the measured $\theta$ in the range $[\theta_{min}+*i-1)\cdot\delta\theta_{th}, \theta_{min}+i\cdot\delta\theta_{th})$ are assigned to bin (A,i); here $\theta_{min}$ may be a minimum exit angle that may be supported in a particular embodiment, and "A" is a label indicating first waveguides. Similarly, in step or operation 1604, second waveguides with the measured $\theta$ in the range $[\theta_{min}, \theta_{min}+\delta\theta_{th})$ may be assigned to bin (B,1), second waveguides with the measured $\theta$ in the range $[\theta_{min}+\delta\theta_{th}, \theta min+2\delta\theta_{th})$ may be assigned to bin (B,2), and so on, so that second waveguides with the measured $\theta$ in the range $[\theta_{min}+*i-1)\cdot\delta\theta_{th}, \theta_{min}+i\cdot\delta\theta_{th})$ may be assigned to bin (B,i); here "B" is a label indicating second waveguides. In step or operation 1605, one waveguide from bin (A, i) and one waveguide from beam (B, i) with matching angle indicators "i" may be selected as the first and second waveguides of a waveguide stack. It will be appreciated that the bins may be labeled or marked in a variety of ways to uniquely indicate the type of the waveguide, i.e. its intended position in the waveguide stack, and the range of measured exit angles.

Embodiments of the method configured for testing 2D waveguides may include measuring the exit angles of the reference beam along two dimensions, e.g. exit angles $\theta x$ and $\theta y$, record the measured exit angles $\theta x$ and $\theta y$, and select first and second waveguides that match each other at both $\theta x$ and $\theta y$ with the pre-defined accuracy.

Method 1600 may be straightforwardly extended to some embodiments of three-waveguide stacks with color cross-coupling, for which FOVs of all three waveguides of the stack share a common FOV portion at one of the color channels. In such embodiment, the reference beam 1501 of the same reference wavelength or color and at the same reference angle of incidence may be used for the first, second, and third waveguides of the stack, and the third waveguides may be binned based on the exit angle similarly to the first and second waveguides. In such embodiments, method 1600 may use three sets of bins, and step or operation 905 may include selecting a waveguide from a matching bin from the third set of bins, where the matching is based on the exit angle $\theta$.

In some embodiments of a three-waveguide stack assembly, such as for example that illustrated in FIGS. 9 and 10, no part of the target polychromatic FOV may be supported by all three waveguides at any color channels of image light, and therefore there may be no single reference beam of a particular color or wavelength that may be coupled into each of the three waveguides of the stack at the same angle. In such embodiment, the method may include using two different reference beams, which may be of two different colors, i.e. two different reference wavelengths, and/or may be incident at different angles; a first reference beam may be used to match first and second waveguides, and a second reference beam may be used to match second and third waveguides of the stack. The method may then include, for example, a) selecting a second waveguide from a set of second waveguides; b) selecting a first waveguide, from a set of first waveguides, that matches the second waveguide with respect to the measured first exit angle; and c) selecting a third waveguide, from a set of third waveguides, that matches the second waveguide with respect to the measured second exit angles.

Figure 23:
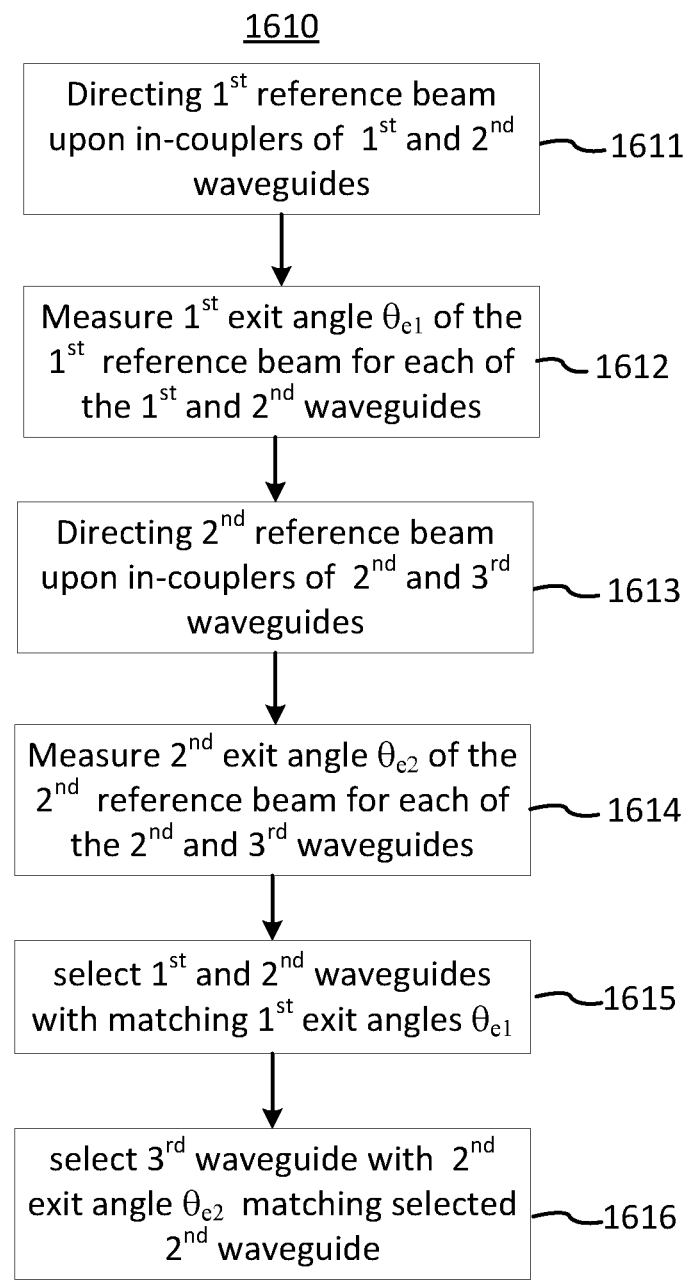
FIG. 23 is a flowchart of a waveguide selection method for fabricating a waveguide stack with color cross-coupling between three waveguides according to an embodiment.

With reference to FIG. 23, there is illustrated a flowchart of a method 1610 for selecting first, second, and third waveguides for a three-waveguide stack with color cross-coupling, which may be viewed as an embodiment of method 1500. Embodiments of method 1610 may be used for both 1D waveguides and 2D waveguides.

Method 1610 may be preceded by providing, for example by acquiring or fabricating, a plurality of first waveguides, a plurality of second waveguides, and a plurality of third waveguides, each comprising an in-coupler and an out-coupler, as described hereinabove. The in-couplers and the out-couplers may be of a nominally identical respective first configurations for each first waveguide, of a nominally identical respective second configurations for each second waveguide, and a nominally identical respective third configurations for each third waveguide. The first waveguides may be configured to have a first FOV, such as for example FOV1 651 of FIG. 10, the second waveguides may be configured to have a second FOV, such as for example FOV2 652, and the third waveguides may be configured to have a third FOV, such as for example FOV3 653. The FOVs of the first and second waveguides, FOV1 and FOV2, may partially overlap to define a first shared FOV, such as shared FOV portion 661 indicated in FIG. 10. The FOVs of the second and third waveguides, FOV2 and FOV3, may partially overlap to define a second shared FOV, such as shared FOV portion 662 indicated in FIG. 10.

Method 1610 may include: (1611) illuminating the input coupler of each waveguide from the sets of first and second waveguides with a first reference light beam within the shared portion of the FOV of the first and second waveguides; (1612) for each waveguide from the sets of the first and second waveguides, measuring an exit angle of the first reference beam exiting from the out-coupler thereof, and recording the measured angle or angles for each waveguide as the first exit angle or angles $\theta_{e1}$; (1613) illuminating the input coupler of each waveguide from the sets of second and third waveguides with a second reference light beam within a shared portion of the FOV of the second and third waveguides; (1614) for each waveguide from the sets of the second and third waveguides, measuring an exit angle of the second reference beam exiting from the out-coupler thereof, and recording the measured angle or angles for each second and third waveguide as the second exit angle or angles $\theta_{e2}$; (1615) selecting first and second waveguides with the first exit angle or angles $\theta_{e1}$ matching with a pre-defined accuracy; and, (1616) for a second waveguide selected at 1615, select a third waveguide from the set of third waveguide that matches the selected second waveguide with respect to the second exit angle or angles $\theta_{e2}$ within a pre-defined accuracy.

In some embodiments, step or operation (1612) may include assigning each, or at least some, of the first waveguides to a bin from a set of first bins based on the measured first exit angle or angles $\theta_{e1}$, and assigning each second waveguides to a bin from a set of second bins based on the measured first exit angle or angles $\theta_{e1}$. Step or operation (1614) may include assigning each, or at least some, of the third waveguides to a bin from a set of third bins based on the measured second exit angle or angles $\theta_{e2}$. It may also include identifying a range of second exit angles $\theta_{e2}$ for waveguides in each bin of the set of second bins. Step or operation 1615 may include selecting first and second waveguides from first and second bins, respectively, that match with respect to the first exit angle or angles $\theta_{e1}$. Step or operation 1616 may include selecting a third waveguide from a third bin that matches the selected second bin with respect to the second exit angle $\theta_{e2}$. The selected first, second, and third waveguides may then be combined to form a waveguide stack with color cross-coupling between the waveguides, and with the target polychromatic FOV that is supported by at least two waveguides in each of at least two color channels.

In some embodiments, the first and second reference beams may be beams of the same color or wavelength that are incident upon the in-coupler of a waveguide 1550 under test at two different angles $\alpha_{t1}$ and $\alpha_{t2}$. The first test angle of incidence $\alpha_{t1}$ may be within the shared FOV portion of the first and second waveguide at a selected color channel, such as for example the shared FOV 661 at the second color channel 312 in FIG. 10. The second test angle of incidence $\alpha_{t2}$ may be within the shared FOV portion of the second and third waveguide at the selected color channel, such as for example the shared FOV 662 at the second color channel 312. It may be advantageous to select a wavelength for the reference beam in a color channel in the middle of the spectrum of intended operation, such as channel 312 in FIG. 10. By way of example, in some embodiments the first reference beam may be a beam of green light that is incident upon the in-coupler of the waveguide under test at the angle of incidence −10° to normal, and the second reference beam may be a beam of green light that is incident upon the in-coupler of the waveguide under test at the angle of incidence +10° to normal. It will be appreciated that the +\−10° values for the test angles $\alpha_{t1} \cdot \alpha_{t2}$ are by way of example only and may be different in different embodiments, and should be selected within a portion of the polychromatic FOV that is supported by both a first and a second waveguide in the selected color channel, or both a second and a third waveguide in the selected color channel.

In some embodiments, the first and second reference beams may be beams of different color or wavelength, which may be incident upon the in-coupler of a waveguide 1550 under test at a same angle of incidence or at different angles of incidence. The first reference beam may be a beam of a first reference wavelength, in the first color channel, e.g. blue. The second reference beam may be a beam of a second reference wavelength, which for example may belong to the third color channel, e.g. red. The first and the second reference beams may be directed at the in-coupler of a waveguide under test at a same angle of incidence. By way of example, for an embodiment of a three-waveguide stack for which the input FOVs of the three waveguides are illustrated in FIG. 11, the first and second reference beams may be both at a normal incidence, since the normal incidence ($\alpha$=0) is within a shared FOV portion 661 of the first and second waveguides, FOV1∩FOV2, for blue light ("B" in FIG. 11), and is also within a shared FOV portion 662 of the second and third waveguides, FOV2∩FOV3, for red light ("R" in FIG. 11). The sign "∩" in an expression of the type "A∩B" means intersection of the sets "A" and "B".

In the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Furthermore, it will be appreciated that each of the example embodiments described hereinabove may include features described with reference to other example embodiments. Furthermore, example embodiments described hereinabove may be modified, and their variations and other embodiments may become apparent to those skilled in the art on the having the benefit of the present description. For example, although the example waveguide assemblies described hereinabove included two-waveguide stack and three-waveguide stacks with color cross-coupling between the waveguides, in other embodiments stacks of four or more waveguides with color cross-coupling between the waveguides may be used to convey three or more color channels with a wider polychromatic FOV. Furthermore, embodiments may be envisioned in which diffraction gratings of at least some of the in-couplers and out-couplers described hereinabove may operate at higher-order diffraction. In another example, in some embodiments different waveguides of the waveguide stack may be of different materials and/or have different refractive indices, and/or have different thickness. Other variations of the described embodiments may become apparent to those skilled in the art based on the present specification.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. A method for fabricating a waveguide stack for conveying polychromatic image light to an exit pupil, the method comprising:
   for each waveguide from a plurality of first waveguides and a plurality of second waveguides, each waveguide comprising an in-coupler and an out-coupler: directing a light beam of a first reference wavelength to impinge upon the in-coupler at a first angle of incidence, and determining an exit angle of the light beam of the first reference wavelength from the out-coupler of the waveguide;

selecting, for the waveguide stack, a first waveguide from the plurality of first waveguides and a second waveguide from the plurality of second waveguides, so that the exit angles of the light beam from the out-couplers of the selected first and second waveguides match with a pre-defined accuracy; and combining the selected first and second waveguides to form the waveguide stack.

2. The method of claim 1 comprising:
for each waveguide from the plurality of first waveguides and the plurality of second waveguides,
measuring the exit angle at which the light beam of the first reference wavelength exits the out-coupler.

3. The method of claim 2 wherein each first waveguide from the plurality of first waveguides is configured for conveying at least a first color channel of the polychromatic image light to the exit pupil, each second waveguide from the plurality of second waveguides is configured for conveying at least one of a second color channel or a third color channel of the polychromatic image light to the exit pupil, and wherein the second color channel is located spectrally between the first and third color channels.

4. The method of claim 3, wherein the selected first waveguide has a first field of view (FOV) defining a range of incidence angles of the polychromatic image light upon the first waveguide that can be conveyed to the exit pupil, wherein the selected second waveguide has a second FOV defining a range of incidence angles of the polychromatic image light upon the second waveguide that can be conveyed to the exit pupil, wherein the first FOV and second FOV partially overlap at the first reference wavelength to define a first shared FOV, and wherein the first angle of incidence is selected within the first shared FOV.

5. The method of claim 4 wherein the first reference wavelength is a wavelength of the second color channel.

6. The method of claim 5 comprising combining the selected first and second waveguides to form the waveguide stack so as to allow the second color channel to be partially coupled into both the first and second waveguides by the in-couplers thereof.

7. The method of claim 1 comprising binning waveguides from the pluralities of first and second waveguides based on the exit angles determined therefor.

8. The method of claim 7 wherein the binning comprises:
assigning at least some of the first waveguides to one of a plurality of first bins based on the exit angle determined therefor, so that the exit angles determined for the first waveguides assigned to a same first bin differ by no more than a first threshold value; and
assigning at least some of the second waveguides to one of a plurality of second bins based on the exit angle determined therefor, so that the exit angles determined for the second waveguides assigned to a same second bin differ by no more than a second threshold value;
wherein the selecting comprises selecting the first and second waveguides from matching first and second bins, respectively.

9. The method of claim 4 further comprising:
for each waveguide of a plurality of third waveguides, each third waveguide comprising an in-coupler and an out-coupler and configured for conveying the second and the third color channels of the polychromatic image light to the exit pupil, determining an exit angle of the light beam of the first reference wavelength from the out-coupler; and selecting, from the plurality of third waveguides, a selected third waveguide for combining with the selected first and second waveguides in the waveguide stack based on the exit angles determined for the first, second, and third waveguides.

10. The method of claim 9 comprising:
for each waveguide of the plurality of third waveguides:
directing the light beam upon the in-coupler at the first angle of incidence; and
measuring the exit angle at which the light beam exits the out-coupler of the waveguide.

11. The method of claim 9 comprising selecting one of the third waveguides for which the exit angle matches the exit angles for the selected first and second waveguides with a pre-defined accuracy.

12. The method of claim 11 comprising binning the first, second, and third waveguides based on the exit angles determined therefor.

13. The method of claim 12 wherein the binning comprises:
assigning each one of the first waveguides to one of a plurality of first bins based on the exit angles determined therefor;
assigning each one of the second waveguides to one of a plurality of second bins based on the exit angles determined therefor; and
assigning each one of the third waveguides to one of a plurality of third bins based on the exit angles determined therefor;
wherein the first, second, and third waveguides are selected for the waveguide stack from matching first, second, and third bins, respectively.

14. The method of claim 3 for fabricating the waveguide stack that further comprises a third waveguide configured for conveying at least the third color channel of the polychromatic image light to the exit pupil, the method further comprising:
determining an exit angle of a light beam of a second reference wavelength from each waveguide of the plurality of second waveguides and a plurality of third waveguides; and
selecting one of the third waveguides for the waveguide stack based on the exit angles of the light beam of the second reference wavelength determined for the second and third waveguides.

15. The method of claim 14 wherein each waveguide of the plurality of third waveguides comprises an in-coupler and an out-coupler, the method comprising:
for each waveguide from the pluralities of second and third waveguides:
directing the light beam of the second reference wavelength upon the in-coupler; and
measuring the exit angle at which the light beam of the second reference wavelength exits the out-coupler of the waveguide.

16. The method of claim 15 wherein the directing comprises directing the light beam of the second reference wavelength upon the in-coupler at a second angle of incidence that is different from the first angle of incidence.

17. The method of claim 15 wherein the second reference wavelength is a wavelength of one of the first or third color channels.

18. The method of claim 15 wherein the selected first waveguide has a first field of view (FOV), the selected second waveguide has a second FOV that partially overlaps with the first FOV at the first reference wavelength to define a first shared FOV, and the selected third waveguide has a third FOV that partially overlaps with the second FOV at the second reference wavelength to define a second shared FOV, and wherein the light beam of the first reference wavelength is directed upon the in-coupler at the first angle of incidence selected within the first shared FOV, and the light beam of the second reference wavelength is directed upon the in-coupler at an angle of incidence selected within the second shared FOV.

19. The method of claim 15 further comprising:
  assigning each one of the first waveguides to one of a plurality of first bins based on the exit angles of the light beam of the first reference wavelength measured therefor;
  assigning each one of the second waveguides to one of a plurality of second bins based on the exit angles of the light beam of the first reference wavelength measured therefor;
  assigning each one of the third waveguides to one of a plurality of third bins based on the exit angles of the light beam of the second reference wavelength measured therefor;
  for each second bin, determining a range of the exit angles of the light beam of the second reference wavelength measured for the second waveguides assigned thereto;
  selecting matching first and second bins from the pluralities of first and second bins, respectively, based on the exit angle of the light beam of the first reference wavelength; and
  selecting, from the plurality of third bins, a third bin that matches the selected second bin with respect to the exit angle of the light beam of the second reference wavelength.

20. A method for fabricating a waveguide stack for conveying polychromatic image light to an exit pupil, the method comprising:
  providing a plurality of first waveguides, each of the first waveguides comprising an in-coupler and an out-coupler and being pre-fabricated according to a same first specification;
  providing a plurality of second waveguides, each of the second waveguides comprising an in-coupler and an out-coupler and being pre-fabricated according to a same second specification;
  for each waveguide from the plurality of first waveguides and the plurality of second waveguides, determining an exit angle of a light beam of a first reference wavelength from the out-coupler of the waveguide, the light beam being coupled into the waveguide by the in-coupler thereof;
  selecting, for the waveguide stack, a first waveguide from the plurality of first waveguides and a second waveguide from the plurality of second waveguides, so that the exit angles of the light beam from the out-couplers of the selected first and second waveguides match with a pre-defined accuracy; and
  combining the selected first and second waveguides to form the waveguide stack;
  wherein the determining comprises directing, prior to the combining, the light beam of the first reference wavelength to impinge upon the input coupler of each waveguide from the plurality of first waveguides and the plurality of second waveguides.

\* \* \* \* \*